(12) United States Patent
Mishra et al.

(10) Patent No.: US 12,164,849 B2
(45) Date of Patent: Dec. 10, 2024

(54) SYSTEM AND METHOD OF SIMULATING AGING IN DEVICE CIRCUITS

(71) Applicant: IMEC vzw, Leuven (BE)

(72) Inventors: Subrat Mishra, Leuven (BE); Pieter Weckx, Bunsbeek (BE); Francky Catthoor, Temse (BE); Alessio Spessot, Heverlee (BE)

(73) Assignee: IMEC VZW, Leuven (BE)

( * ) Notice: Subject to any disclaimer, the term of this patent is extended or adjusted under 35 U.S.C. 154(b) by 943 days.

(21) Appl. No.: 17/039,571

(22) Filed: Sep. 30, 2020

(65) Prior Publication Data

US 2022/0100939 A1    Mar. 31, 2022

(51) Int. Cl.
| | |
|---|---|
| *G06F 30/3308* | (2020.01) |
| *G06F 30/367* | (2020.01) |
| *G06F 30/392* | (2020.01) |
| *G06F 30/398* | (2020.01) |
| *G06F 115/06* | (2020.01) |
| *G06F 119/04* | (2020.01) |

(52) U.S. Cl.
CPC ........ *G06F 30/3308* (2020.01); *G06F 30/392* (2020.01); *G06F 30/398* (2020.01); *G06F 2115/06* (2020.01); *G06F 2119/04* (2020.01)

(58) Field of Classification Search
CPC .. G06F 30/3308; G06F 30/392; G06F 30/398; G06F 2115/06; G06F 2119/04; G06F 30/367
See application file for complete search history.

(56) References Cited

U.S. PATENT DOCUMENTS 10,621,494 B2 *  4/2020  Xu ................ G06N 3/045
11,408,932 B2 *  8/2022  Fayneh ............ G01K 7/32
(Continued)

OTHER PUBLICATIONS

Pour Aryan, N., et al. "From an Analytic NBTI Device Model to Reliability Assessment of Complex Digital Circuits" IEEE 20th Int'l On-Line Testing Symp., pp. 19-24 (2014) available from <https://ieeexplore.ieee.org/abstract/document/6873666> (Year: 2014).*

(Continued)

*Primary Examiner* — Jay Hann
(74) *Attorney, Agent, or Firm* — Knobbe, Martens, Olson & Bear LLP

(57) ABSTRACT

A system and method of simulating device aging based on a digital waveform representative of a workload of an electronic device are disclosed. In one aspect, the method comprises grouping contiguous sets of cycles into segments, each set corresponding to a segment. Each segment has values for a combination of segment parameters that are unique from each of the other segments and a start point that is separated from a start point of an adjacent segment by a pre-defined distance criterion. Grouping the sets into the segments comprises, for each segment: sampling one or more sequential cycles of the workload, generating the segment based on the sampled contiguous cycles having a period exceeding a threshold period, and determining the values for the combination of segment parameters. The method further comprises applying an aging model to the segments to simulate the aging. The segments are a representation of the digital waveform.

13 Claims, 13 Drawing Sheets

(56) References Cited

U.S. PATENT DOCUMENTS

2016/0283629 A1* 9/2016 Weckx .................. G06F 30/367
2018/0284177 A1* 10/2018 Altieri Scarpato ... G06F 11/261

OTHER PUBLICATIONS

Duch, Loris "Hardware / Software Architectural and Technological Exploration for Energy-Efficient and Reliable Biomedical Devices" Thesis, Ecole Polytechnique Federale De Lausanne (2018) (Year: 2018).*

Duch, L., et al. "Analysis of Functional Errors Produced by Long-Term Workload-Dependent BTI Degradation in Ultralow Power Processors" IEEE Transactions on Very Large Scale Integration (VLSI) Systems, vol. 28, No. 10 (Jul. 2020) (Year: 2020).*

Yang, Z., et al. "Workload-aware failure prediction method for VLSI devices using an LUT based approach" IEEE Int'l Instrumentation & Measurement Tech. Conf. (2018) available from <https://ieeexplore.ieee.org/abstract/document/8409562> (Year: 2018).*

S. Mishra et al., Fast & Accurate Methodology for Aging Incorporation in Circuits using Adaptive Waveform Splitting (AWS), IEEE IRPS 2020 Conference, Mar. 31, 2020.

Francky Cathoor, et al., System-Scenario-based Design Principles and Applications, Chapters 2-4, pp. 7-97 (2020).

D. Rodopoulos, et al., "Atomistic Pseudo-Transient BTI Simulation With Inherent Workload Memory," in IEEE Transactions on Device and Materials Reliability, vol. 14, No. 2, pp. 704-714, Jun. 2014.

D. Stamoulis et al., "Capturing True Workload Dependency of BTI-induced Degradation in CPU Components," 2016 International Great Lakes Symposium on VLSI (GLSVLSI), Boston, MA, 2016, pp. 373-376.

E. Mintarno, et al., "Workload Dependent NBTI and PBTI Analysis for a sub-45nm Commercial Microprocessor," 2013 IEEE International Reliability Physics Symposium (IRPS), Anaheim, CA, 2013, pp. 3A.1.1-3A.1.6.

R. Wittmann, "Miniaturization Problems in CMOS Technology: Investigation of Doping Profiles and Reliability", http://www.iue.tuwien.ac.at/phd/wittmann/node10.html, downloaded on Dec. 23, 2020 in 20 pages.

* cited by examiner

SYSTEM AND METHOD OF SIMULATING AGING IN DEVICE CIRCUITS

BACKGROUND

Technological Field

The disclosed technology relates to simulation of electronic circuits (for example, aging or degradation of the electronic circuits, hereinafter referred to as circuits) under time dependent and similar variability and, in particular, to the simulation of large circuits over extended lifetimes, where the variability is dependent on a workload signal (e.g., voltage and temperature sequence) for the circuits. The simulation may be based on analyzing a digital waveform representative of a workload signal for the circuits.

Description of the Related Technology

As semiconductor devices scale to smaller dimensions and become more advanced with more restricted constraints (for example, temperature, voltage, and similar constraints), various time-varying phenomena impact reliability of the devices. For example, phenomena include bias temperature instability (BTI), random telegraph noise (RTN) and hot-carrier injection (HCI). Each phenomena may have a partly stochastic and a partly deterministic basis and depend upon random events at the atomic level, but the probability of the events partly depends on operating conditions, such as voltage and temperature, and their particular sequence. The effects of these phenomena may accumulate over operating lives of the devices, gradually degrading characteristics and performance of the devices.

The time-dependent variability of circuits results in degradation over time of one or more performance metrics of a circuit containing such devices, and such degradation accumulates and increases as time passes. Quantifying these phenomena and/or their effects in an accurate and reliable manner enables circuit and device designers to better design the circuits and devices to avoid, minimize, or otherwise account for degradation caused by the workload signal.

SUMMARY OF CERTAIN INVENTIVE ASPECTS

In some aspects, a method of simulating device aging based on a digital waveform representative of a workload of an electronic device is disclosed. The method comprises grouping contiguous sets of cycles into a plurality of segments, each set of cycles corresponding to a segment, wherein each segment has values for a combination of segment parameters that are unique from each of the other segments and a start point that is separated from a start point of an adjacent segment by a pre-defined distance criterion. The grouping of the contiguous sets of cycles into the plurality of segments comprises, for each segment: sampling one or more sequential cycles of the workload, generating the segment based on the sampled contiguous cycles having a period exceeding a threshold period, and determining the values for the combination of segment parameters. The method further comprises applying an aging model to the segments to simulate the aging for the programmable device based on the workload, wherein the segments are a representation of the digital waveform.

In some instances, the distance criterion is based on a number of cycles in a segment having a period exceeding the threshold period, and wherein the combination of segment parameters comprises a duty factor (DF), a frequency (f), and a time duration ($\Delta t$) for each segment. The method may further comprise clustering contiguous segments into a set of scenarios that correspond to aging models based on start times of the scenarios. When one of the scenarios repeats itself a number of times consecutively, one of the aging models may be applied to the repeating scenario to calculate aging for the device based on a pre-defined relationship between degradation of the device and the workload of the device characterized by values for a combination of scenario parameters. The combination of scenario parameters may comprise a scenario DF, a scenario f, and a scenario $\Delta t$ for each scenario and wherein the values for the combination of scenario parameters are determined based on an effective DF for the scenario.

In some embodiments, the pre-defined relationship includes a linear relationship between the degradation of the device and the workload of the device and is characterized by one of the segment DF and the segment f, and each of the segment DF and the segment f is representative of the digital waveform segment. Furthermore, a number of different scenarios may be repeated at least once over the duration of the digital waveform, and the degradation of each of the different scenarios may be stored in a first lookup table relative to an initial condition of the degradation. In some instances, the DF, the f, and the $\Delta t$ of the combination of segment parameters for the segment are averaged for the sampled cycles of the digital waveform that form the segment. In some instances, the applying of the aging model comprises accessing look up tables and using the values for the combinations of segment parameter values to simulate short-term and long-term aging for the device. In some embodiments, grouping the contiguous sets of cycles into the plurality of segments further comprises, for each segment: determining that the period of the sampled sequential cycles does not exceed the threshold period; aggregating one or more additional sequential cycles with the sampled sequential cycles based on the determination that the period does not exceed the threshold period; and determining that the period of the aggregated additional sequential cycles with the sampled sequential cycles exceeds the threshold period. The method may also generate the segment based on the sampled contiguous cycles and the additional sequential cycles.

In some instances, the method further comprises evaluating the degradation of the device based on a set of aging models for a set of scenarios occurring in an arbitrary sequence over a duration of the digital waveform.

In some aspects, a method of generating signal information simulating device aging based on a digital waveform representative of a workload of the device is disclosed. The method comprises initializing a memory buffer for storage of a segment of the digital waveform, incrementally accumulating additional cycles of the workload in the segment in the memory buffer until a period of the segment is greater than a threshold period, determining that the period of the segment is greater than the threshold period, determining each of a duty factor, a frequency, and a duration of the segment, storing the duty factor, frequency, and duration in a lookup table, and applying the lookup table to simulate the device aging with respect to the digital waveform.

In some aspects, a system for simulating device aging based on a digital waveform representative of a workload of an electronic device is disclosed. The system comprises one or more processors configured to execute instructions; and a non-transitory, computer readable medium configured to store the instructions. The instructions, when executed by the processor, cause the processors to: group contiguous sets of cycles into a plurality of segments, each set of cycles corresponding to a segment, wherein each segment has values for a combination of segment parameters that are unique from each of the other segments and a start point that is separated from a start point of an adjacent segment by a pre-defined distance criterion. The instructions that cause the processors to group the contiguous sets of cycles into the plurality of segments further cause the processors to, for each segment: sample one or more sequential cycles of the workload, generate the segment based on the sampled contiguous cycles having a period exceeding a threshold period, and determine the values for the combination of segment parameters. The instructions further cause the processors to apply an aging model to the segments to simulate the aging for the programmable device based on the workload, wherein the segments are a representation of the digital waveform.

In some aspects, a workload analyzer for digital circuit design optimization is disclosed. The workload analyzer comprises a gate level simulation, receiving waveform information from a physical design tool, being configured to generate simulation data for one or more components of the digital circuit design and a circuit degradation and extrapolation tool, receiving the simulation data from the gate level simulation, being configured to generate optimization information comprising timing derate factors that are provided back to the physical design tool for final circuit routing. In some instances, the gate level simulation further receives circuit information from the physical design tool. In some instances, the physical design tool includes a place and route tool. The place and route tool may include a circuit routing tool and the optimization information is provided directly to the final circuit routing. The physical design tool receives a gate netlist, a specification representing a physical layout of the digital circuit design, and design constraints from a logic design tool. The digital circuit design may be a design for an application specific integrated circuit (ASIC).

BRIEF DESCRIPTION OF THE DRAWINGS

The above, as well as additional objects, features and advantages of the disclosed technology, will be better understood through the following illustrative and non-limiting detailed description, with reference to the appended drawings. In the drawings, like reference numerals will be used for like elements unless stated otherwise.

DETAILED DESCRIPTION OF CERTAIN ILLUSTRATIVE EMBODIMENTS

Figure 1:
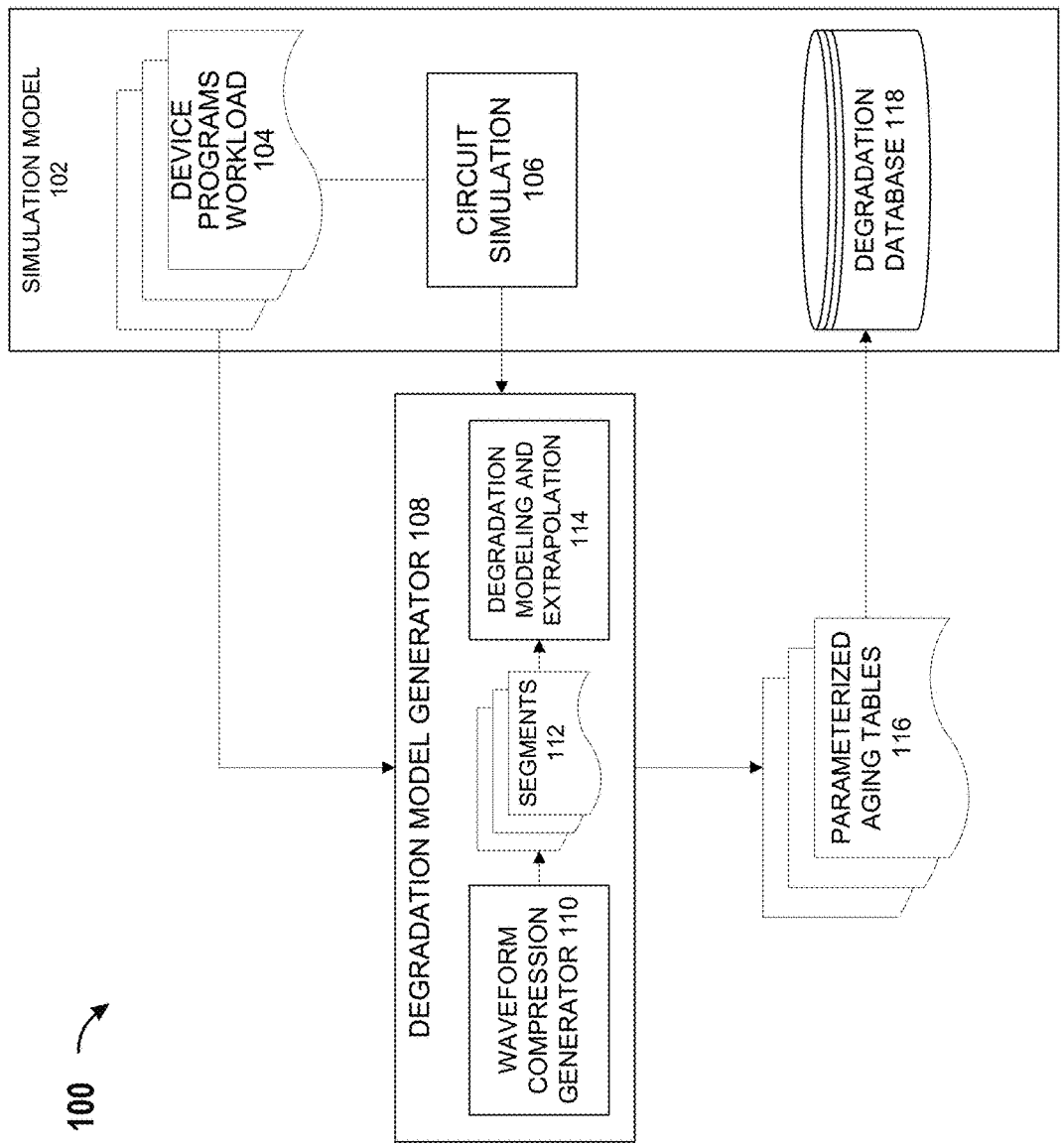
FIG. 1 shows a simplified diagram of representative flows through component blocks of a circuit aging analysis system, as described herein.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the disclosed technology, as generally described herein, and illustrated in the Figures, can be arranged, substituted, combined, and designed in a wide variety of different configurations, all of which are explicitly contemplated and made part of this disclosure.

The disclosed technology relates to systems and methods of simulating electronic circuit aging for electronic circuits that comprises one or more semiconductor and similar electronic devices by generating a compressed digital waveform representative of a workload signal applied to the electronic circuits. Electronic circuits (also referred to herein as "circuits", "electronic devices", "devices", "chips", and the like) may degrade over an extended period or lifetime of use, for example, due to exposure to an environment or use under designed conditions and operation. Such degradation over time may be referred to as aging related degradation of the electronic circuits. This aging may occur due to physical mechanisms, for example Bias Temperature Instability (BTI) and Hot Carrier Injection (HCI), Electromigration (EM), Low-K time-dependent dielectric breakdown (TDDB), among others. Such physical mechanisms may cause one or more components of the circuits and wire related parameters to degrade. This degradation can lead to timing violations and/or failures of the components and the related circuits. In some embodiments, the degradation caused by the physical mechanisms depends on or is a result of a workload profile (referred to herein interchangeably as a "workload profile" or "workload signal") that the components and circuit are exposed to during operation of the circuits. For example, programs operating on the circuits or using the circuits may subject the circuits to particular workloads. In some embodiments, circuits may have unique or different workload profiles based on the application(s) of the circuits. Because such degradation can affect lifetimes and operations of circuits, an ability to accurately and efficiently predict circuit degradation (and recovery) can assist in developing new and/or optimized circuits for particular applications and use cases.

In some embodiments, the degradation of the circuits due to the workload may not be constant, and pulses associated with the workload may be random and inconsistent in sequence. For example, different segments or portions of the workload may cause different amounts of degradation to the circuits. Furthermore, the segments may have different impacts on the degradation depending on when they occur, even if the segments themselves include the same aspects of the workload. For example, some segments of the workload have a larger impact on the degradation of the circuit when they occur later in the circuit lifetime while other events have a smaller impact on the degradation of the circuit later in the circuit lifetime. As introduced above, the degradation of the circuit can cause various issues, including timing errors, calculation errors, circuit failure, and the like. Various algorithms exist to enable simulation and/or estimation of degradation of these circuits and corresponding devices.

More specifically, the disclosed technology solves problems associated with workload dependent circuit aging and degradation that are difficult to simulate with previous technologies, for example due to computational overhead and/or run time required to generate corresponding results. Furthermore, the disclosed technology may enable projection of calculated aging and degradation results from a calculated single cycle or other "short-term" interval or window to an end-of-life, or otherwise "long-term" interval or point. Therefore, the disclosed technology may provide highly accurate, long-term degradation projections (referred to herein interchangeably with extrapolations) based on faster and lower overhead calculations as compared to previous technologies. Specifically, the disclosed technology exploits linearity of degradation caused by the workload. For example, systems and methods of the disclosed technology may use duty factors of segments of the workload to calculate and extrapolate degradation values of the circuit due to any arbitrary sequence of pulses within the workload. The linearity of the relationship between the degradation and the workload enables projection of the degradation between different length or term durations. A representative system corresponding to the disclosed technology is shown and described with respect to FIG. 1.

FIG. 1 shows a simplified diagram of representative flows through component blocks of a circuit aging analysis system 100, as described herein. A more detail representation is provided below with respect to FIG. 8. The flow begins with a simulation model 102, which may correspond to various systems, components, and/or data related to the circuit degradation analysis and/or estimation. As shown, the simulation model 102 comprises a device programs workload 104 and a circuit simulation 106. The device programs workload 104 may be signals or representations of one or more workloads that the circuit experiences in its operation. Similarly, the circuit simulation 106 may be a representation or simulation of the circuit for which the degradation analysis and/or estimation is being performed. For example, though not shown as such, the circuit simulation 106 may comprise a database or similar storage of representations or simulations of various circuits. Together, the circuit simulation 106 and the device programs workload 104 may provide a representation for a real-world circuit and its expected operation over the course of the lifetime of the circuit.

As shown in FIG. 1, the circuit simulation 106 provides a simulated circuit to the degradation model generator 108 while the device programs workload 104 provides a corresponding workload signal for the provided simulated circuit to the circuit simulation 106. Together, the provided device program workload and the provided circuit simulation provide details necessary to analyze and/or estimate degradation for the circuit simulated by the provided circuit simulation. In other words, the device programs workload 104 and the circuit simulation 106 provide the workload signal to the degradation model generator 108 for simulation and/or processing to generate degradation models for the particular electronic circuit and corresponding workload program. In some embodiments, the degradation model generator 108 is implemented by a computer processing system or computing system The degradation model generator 108 may generate modeling information that can be used to provide the improved degradation estimation and analysis for circuits and corresponding devices, as described herein. More specifically, the degradation model generator 108 generates aging tables for use by the simulation model 102 to generate the improved degradation estimates and analysis described herein. The degradation model generator 108 comprises a generator 110, which generates one or more segments 112 based on the received workload signal from the circuit simulation 106. Details of the processing and/or data flow of the waveform compression generator 110 are provided below with reference to FIG. 5.

In brief, the waveform compression generator 110 may continuously process consecutive samples of the workload signal to generate the one or more segments 112 based on a collection of the consecutive samples exceeding a threshold level, where each generated segment has unique values for segment parameters including frequency, duty factor, and period. In some embodiments, the frequency, duty factor, and period for the segment parameters may be generated based on averaging the corresponding values for the sampled cycles that form the segment. The degradation model generator 108 may further generate one or more lookup tables (LUTs) based on the generated segments, where the segment parameters are used to determine how to create the lookup tables based on the generated segments. For example, a degradation modeling and extrapolation block 114 may populate the LUTs for use as parametrized aging tables 116, where the segment parameters introduced above and described in more detail below, may determine how to populate the LUTs. Once the parametrized aging tables 116 (which may comprise short and long term aging tables) are generated, a degradation database 118 of the simulation model 102 stores the generated parameterized aging table and apply the parameterized aging tables 116 to perform the degradation analysis and estimation and generate the improved degradation and circuit aging estimation as described herein. Further details of the circuit aging analysis system 100 are provided below with respect to FIGS. 5 and 8 and corresponding description.

Figure 2:
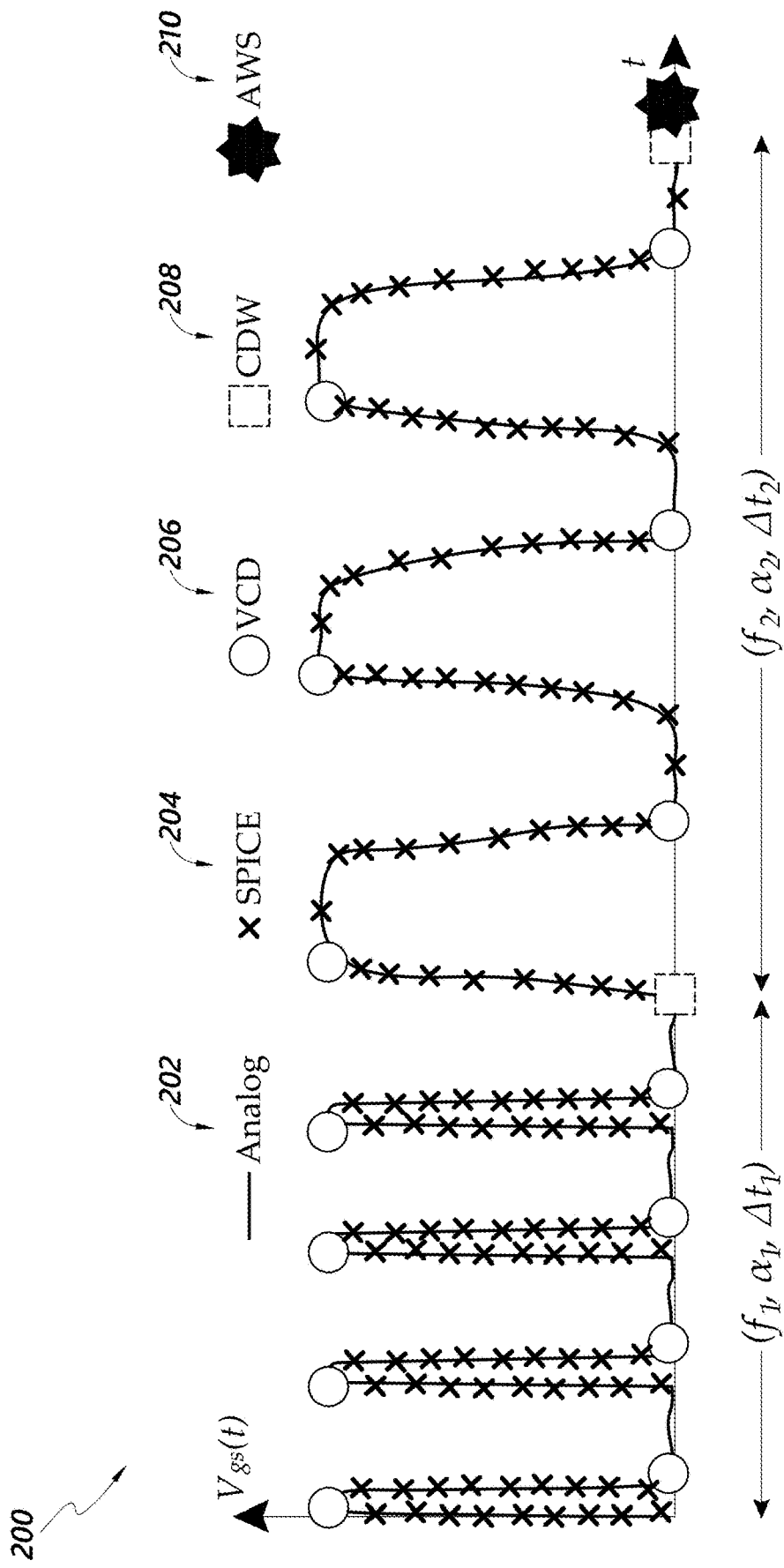
FIG. 2 provides a comparison graph showing how a workload signal or different waveforms can be represented by different simulation points that provide a digital representation.

Analyzing and predicting circuit degradation may involve significant overhead depending on the algorithm applied to sample the workload signal. For example, certain algorithms of previous technologies involve capturing and processing large numbers of samples of the workload signal to perform the degradation analysis and estimation. However, processing many samples may require additional processing overhead. FIG. 2 provides a comparison graph 200 showing how a workload signal or different waveforms 202 can be represented by different simulation points that provide a digital representation. The workload signal 202 is shown having two distinct regions each with different frequencies (f1, f2), duty factors ($\alpha 1$, $\alpha 2$), and period durations ($\Delta t1$, $\Delta t2$) from the other. The comparison 200 shows how different simulation algorithms may process the waveform 202, specifically showing simulation points of the workload signal 202 of a simulation program with integrated circuit emphasis (SPICE) 204, a value change dump algorithm 206, a compact digital waveform algorithm 208, and an adaptive waveform splitting (AWS) algorithm 210. The SPICE simulation results in a large number of SPICE simulation points 204, represented by the 'x' along the workload signal 202. The simulation according to VCD results in VCD simulation points 206 at every peak and every valley of the workload signal 202, represented by the 'circle' at every peak and valley. The CDW simulation results in a much smaller number CDW simulation points 208 as compared to the SPICE and VCD samples 204 and 206, respectively, represented by the two 'squares' shown on the workload signal 202. The simulation according to AWS results in a single AWS simulation point 210 at the end of the depicted waveform signal 202. Thus, the AWS simulation point 210 can represent the entire analog workload signal 202 shown in FIG. 2 with a single point, reducing resource demands for processing as compared to similar processing that would be needed for each of the SPICE, VCD, and/or the CDW algorithms. More particularly, the AWS simulation point 210 uniquely represents, in the single AWS sample 210, the workload signal 202 having the two distinct regions, each with unique frequencies, duty factors, and period durations, whereas even the CDW simulation points 208 cannot handle workload signal segments having different segment parameters (for example, different beyond a threshold value) in a single representation. For example, the CDW simulation points 208 divide the workload signal 202 into two regions for the same portion of the workload signal 202 represented by the single AWS simulation point 210, where the workload signal 202 is separated into the two regions at the change in the workload signal 202 between the two regions. The comparison of the number of segments or simulation points for each of the SPICE algorithm, VCD algorithm, CDW algorithm, and AWS algorithm provides a comparison of a quantity of simulations and/or calculations applied to the workload signal 202. As described herein, the AWS simulation point 210 shows that the corresponding simulation and/or analysis of the workload signal 202 is more efficient than any of the SPICE, VCD, and CDW algorithms and at least similarly as accurate, providing benefits over these simulation and/or analysis systems and methods. In some embodiments, the AWS simulation point 210 is separated from a previous or subsequent AWS simulation point (not shown) by a distance, the portion of the workload signal 202 represented by the AWS simulation point 210 may be a segment, as described in further detail below. The distance between corresponding points of subsequent AWS simulation points (for example, start-to-start of the subsequent AWS simulation points) may be identified based on a number of cycles in the segment. For example, the number of peak to valley transitions between AWS simulation points (for example, the number of peak to valley transitions shown in FIG. 2) may be indicative of the number of cycles in the segment and may be determinative of the distance between subsequent AWS simulation points. In some embodiments, this distance is based on the number of cycles in the corresponding segment having the period exceeding a threshold period, meaning that the segment meets threshold requirements described in further detail in FIG. 5 below. In some embodiments, the threshold requirements (i.e., the threshold period) is determined based on the distance. The segments may be decided based on a fixed threshold value within the workload signal 202. Under some conditions, the workload signal 202 may include two or more different scenarios (as described below) combined, in which case the threshold values could change.

As introduced by FIG. 2 and the corresponding description, previous technologies estimate aging in the circuits in various ways. For example, some systems introduce a fixed or worst case, delay de-rating factor as a margin (i.e., boundary) so that timing violations never occur in the circuits under various operating regimes. However, such a conservative approach that applies blanket aging margins to the circuits may not provide sufficiently accurate or specific aging/degradation estimation as technology nodes or the circuits become more advanced and have more stringent (i.e., restrictive) operating constraints. Such worst case and/or typical condition (i.e., Corner Analysis) aging timing margins may no longer be tolerated due to stricter design specification requirements in the advanced technologies. Furthermore, application of such margins (for example, by the previous technologies and methods) does not account for the actual workloads of the circuits. Accordingly, under the Corner Analysis and similar analysis technologies, the degradation estimation may not be accurate to the circuit on which the analysis is performed. Furthermore, the previous technologies may apply an effective stress time or so-called signal probability (SP) while calculating degradation under realistic workload scenarios for the circuits. However, because such systems and methods are not purely physics-based, resulting aging estimations may incur erroneous degradation estimates and take longer to generate.

An additional option for the previous technologies includes applying cycle-accurate (CA) simulations to the circuit, but such simulations are computationally expensive and time intensive, thereby making them generally unsuitable for large and/or complicated circuit designs. Previous technologies may further employ empirical models that, while potentially based on true atomistic physics mechanisms present in the circuits and/or devices and wires of interest, can at most be interpolated between sufficiently close calibrated operating points. Thus, each of the previous technologies for analyzing degradation of circuits is flawed or impractical for large or complex circuits. Additionally, the previous systems and methods do not provide degradation information that is accurately and/or reliably extrapolated from relatively short period measurements to full lifetimes of the corresponding circuits. Therefore, the previous technologies have to perform the degradation calculation for various time periods instead of being able to extrapolate between time periods as in the disclosed technology. Hence, these previous technologies are lacking in various ways that the disclosed technology described herein cures. A discussion of why the previous technologies are unsuitable for advanced and/or large system degradation analysis and prediction is provided below with reference to FIGS. 3A and 3B.

Figure 3A:
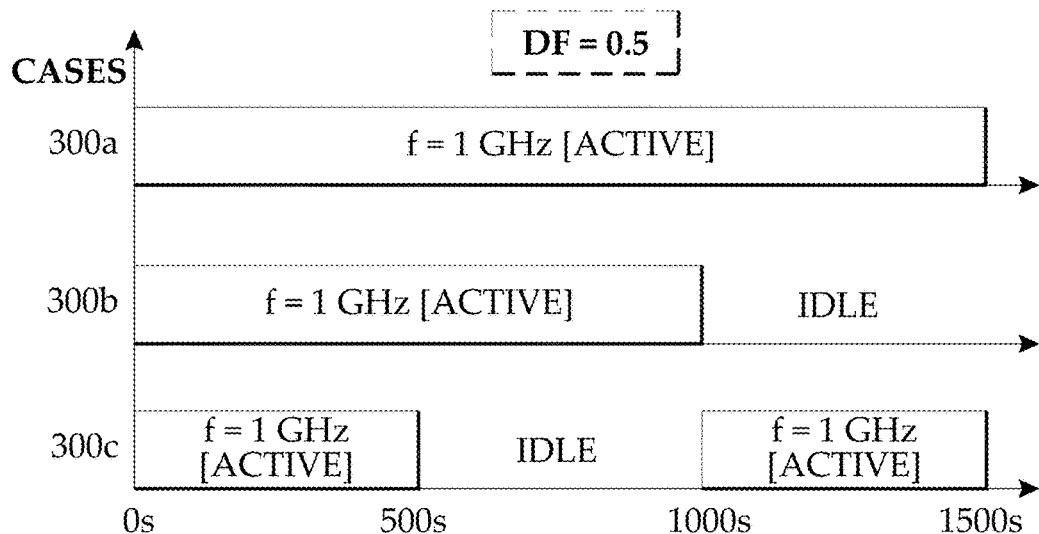
FIG. 3A provides example workload profiles as applied to a circuit (for example, workload profiles applied to a gate input of a transistor under Negative Bias Temperature Instability (NBTI) stress).
Figure 3B:
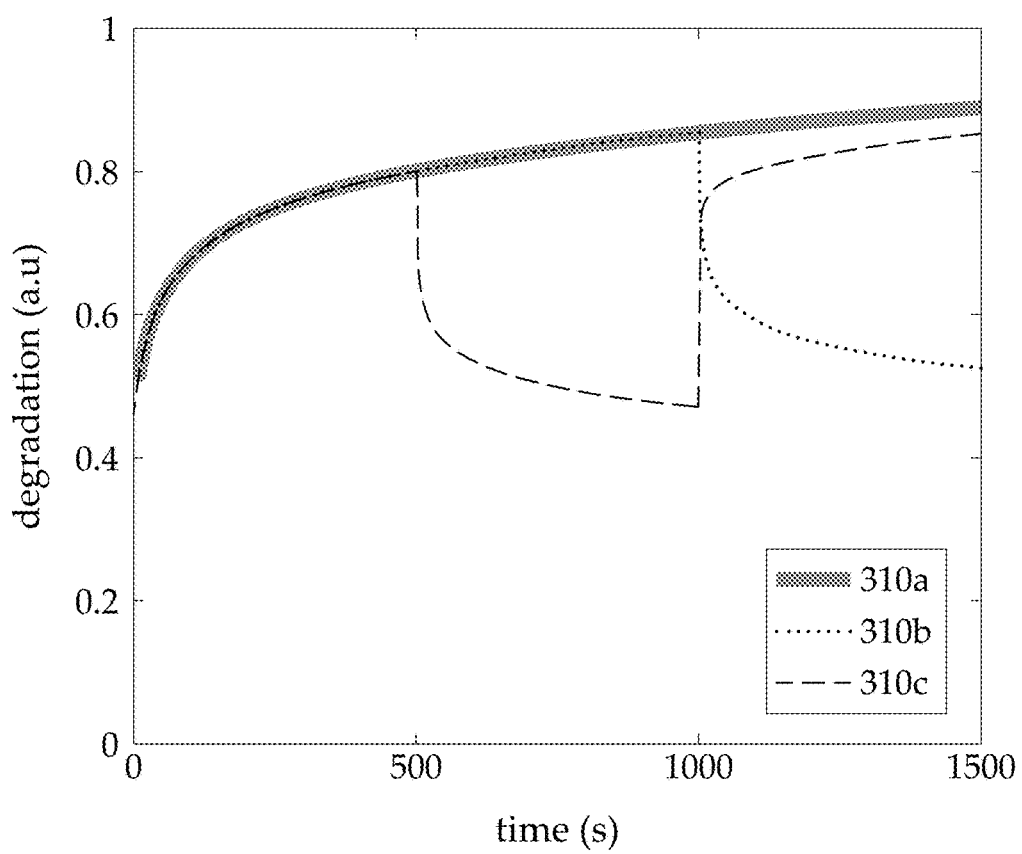
FIG. 3B provides a graph showing corresponding simulated or estimated degradations (estimated degradations) associated with each of the workload profiles of FIG. 3A.

FIG. 3A provides example workload profiles 300a-300c as applied to a circuit (for example, workload profiles applied to a gate input of a transistor under NBTI stress). FIG. 3B provides a graph showing corresponding simulated or estimated degradations (estimated degradations) 310a-310c associated with each of the workload profiles 300a-300c of FIG. 3A. As FIG. 3B shows, as time increases and the circuit is exposed to more of the workload, the degradation of the circuit increases. The workload profiles 300a-300c each relate to a particular workload signal having active and passive/idle modes or durations that are different between each of the workload profiles 300a-300c. During the active mode, the frequency of the workload profiles 300a-300c is 1 GHz with a duty factor (DF) of 0.5, so the frequency for each of the workload profiles 300a-300c is 1 GHz and the DF for each of the workload profiles 300a-300c is 0.5. However, differences between each of the workload profiles 300a-300c include when the active modes occur and for how long the active modes last. As shown in FIG. 1A, the workload profile 300a is in the active mode between 0 seconds (s) and 1500 s with no shown passive/idle mode, the workload profile 300b is in the active mode between 0 s and 1 s and in the passive/idle mode between 1 s and 1.5 s, and the workload profile 300c is in the active mode between 0 s and 0.5 s and 1 s and 1.5 s and the passive/idle mode between 0.5 s and 1.0 s. The workload profiles 300a-300c represent different variations of the BTI stress and relaxation simulations, for example, performed using calibrated models based on capture/emission time (CET) maps for the circuits. The estimated degradations 310a-310c of FIG. 3B represent a calculated or estimated degradation caused by the NBTI stress applied to the circuits, for example the gate input of the transistor posed above, with each of the workload profiles 300a-300c. For example, the estimated degradation 310a for the workload profile 300a shows an increasing degradation as time increases, corresponding to the continuous active mode of the workload profile 300a. The estimated degradation 310b for the workload profile 300b shows a degradation that increases while in the active mode but that decreases when in the passive mode. The estimated degradation 310c for the workload profile 300c shows a periodic increasing degradation that corresponds to the active mode for the workload profile 300c. In some instances, while each of the workloads have the same frequency and duty factor, as explained above, the actual active mode and passive/idle mode sequence differences between the workload profiles 300a-300c are shown to impact the corresponding degradation of the circuits, as the estimated degradations 310a-310c show different degradation changes in response to the corresponding workload profiles (for example, between times 1000 and 1500 seconds) and end at different degradation amounts at time 1500 seconds.

The workload profile 300a-300c, as shown, differ in a sequence of applied active and passive modes. The workload profile 300a is active for the entirety of the period from 0 s to 1500 s while the workload profiles 300b and 300c maintain the same total effective active and passive/idle mode durations between the 0 s and 1500 s period shown in FIGS. 3A and 3B for a total of 1000 s in the active mode and 500 s in the passive/idle mode. However, as shown with respect to the estimated degradations 310a-310c of FIG. 3B, corresponding simulated degradation patterns for the different workload profiles 300a-300c, as well as the end point degradation, differ between the different workload profiles 300a-300c. This is contrary to, for example, the SP-based aging or degradation estimate approach of previous technologies introduced above, which predict that the degradation behavior in the circuits is dependent on the effective stress time or stress time and recovery time ratio. For example, under the SP-based mechanism, the estimated degradations for the workloads 300b and 300c should have the same degradation end values because the workload profiles 300b and 300c share the same total active/passive mode times or ratio for the workload profiles 300b and 300c (of 1000 s of active mode duration and 500 s of passive/idle mode duration). However, as shown in FIG. 3B, even though the workload profiles 300b and 300c share the active mode and passive/idle mode durations and ratio, the degradation 310b is different from the degradation 310c. Such a discrepancy between the previous technologies (i.e., the SP-based mechanism) and the systems and methods described herein shows the importance of preserving and accounting for the activity sequence (i.e., the actual workload signal) of the circuits when evaluating their degradation or aging. This also shows one of the benefits of the disclosed technology over the previous technologies.

Thus, to cure the deficiencies of the previous technologies, the disclosed technology employs the adaptive waveform splitting (AWS) algorithm that enables fast and accurate calculation of workload-dependent circuit and/or device aging. The systems and methods described herein apply the AWS algorithm to perform faster aging estimation of circuits large and small under specific workload scenarios as compared to the previous technologies. The AWS algorithm may perform or be used in conjunction with a workload dependent aging analysis algorithm or model while accounting for corresponding complexities and run-time issues associated with considering a more realistic or "true" workload for the device being tested or analyzed while preserving accuracy of the aging analysis and predictions. For example, the AWS algorithm may employ aging based models calibrated to the same circuit.

Figure 3C:
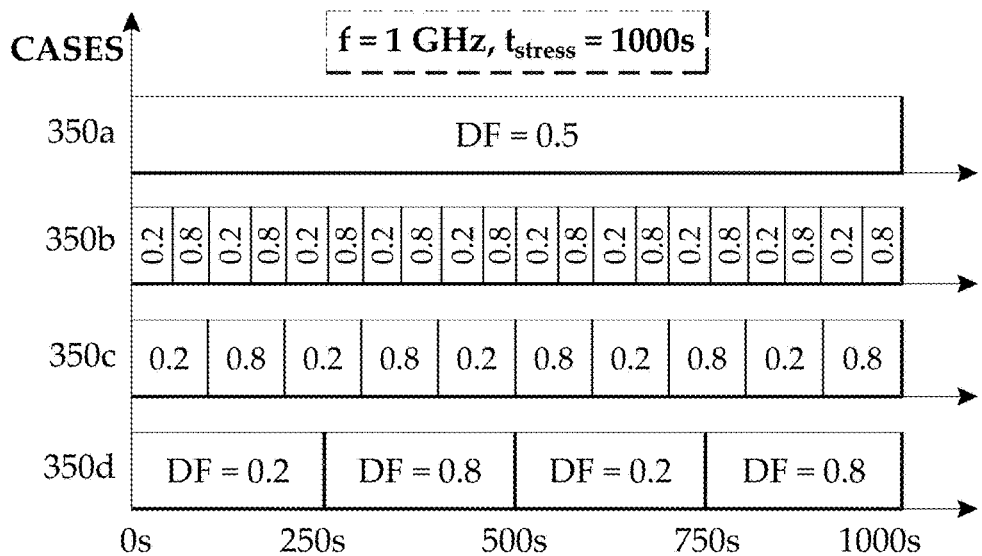
FIG. 3C provides example duty factors for workload profiles as applied to a circuit (for example, workload profiles applied to a gate input of a transistor under NBTI stress).
Figure 3D:
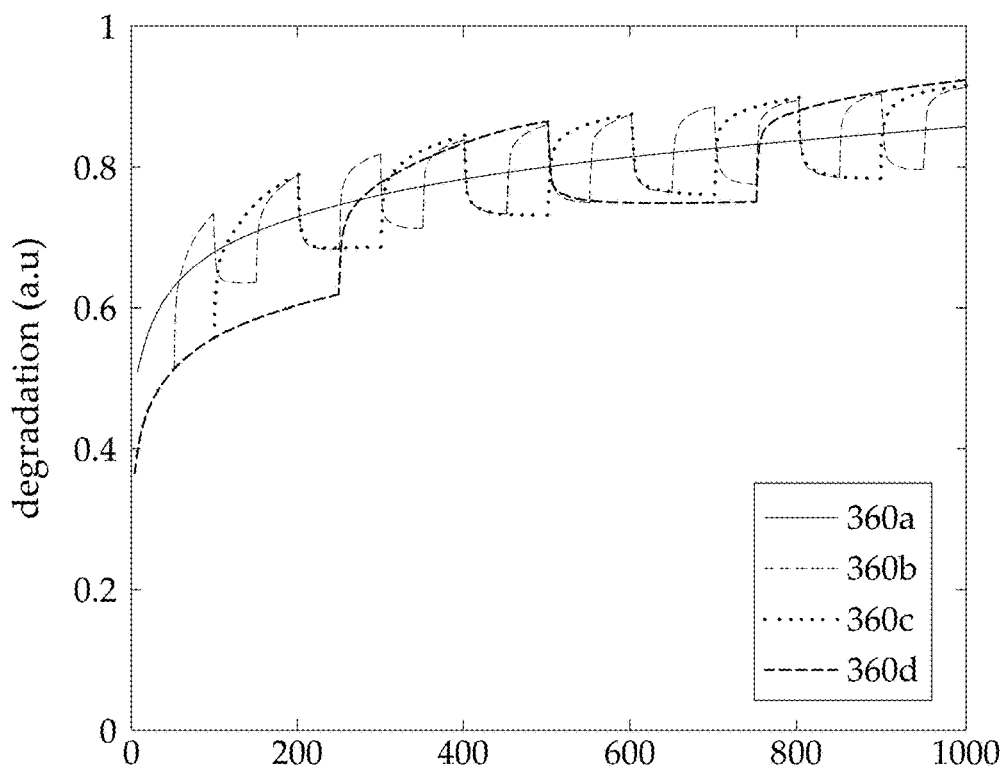
FIG. 3D provides a graph showing corresponding simulated or estimated degradations (estimated degradations) associated with each of the workload profiles of FIG. 3D.

A discussion of how different workloads demonstrate duty factor averaging over a course of the workload with respect to the degradation impact on circuit is provided below with reference to FIGS. 3C and 3D. For example, referring to FIGS. 3C and 3D, each of workload profiles 350a-350d of FIG. 3C have different duty factor (DF) workloads that, over an entirety of the workload, average to a similar duty factor value of 0.5. FIG. 3C provides example duty factors for workload profiles as applied to a circuit (for example, workload profiles applied to a gate input of a transistor under NBTI stress). FIG. 3D provides a graph showing corresponding simulated or estimated degradations (estimated degradations) associated with each of the workload profiles of FIG. 3D.

More specifically, the workload profiles 350a-350d of FIGS. 3C and 3D present a set of workload profiles which all have a fixed frequency f=1 GHz for the entire stress duration. Workload profiles 350b, 350c, and 350d comprise of alternating segments of DF (0.2 and 0.8) but have a common mean DF=0.5 over the stress period, which is consistent with the workload profile 350a, which is fixed DF of 0.5. FIG. 3D shows that the four workload profiles 350a-350d generate estimated degradations 360a-360d, respectively. As shown, the workload profiles 350a-350d can cause distinctions in the resulting degradation estimations 360a-360d of the workloads on the circuit, even when a mean DF between the workload profiles 350a-350d is the same. For example, when the mean DF is 0.5, the individual workload profiles have a consistent or constant DF of 0.5 (for example, for the workload profile 300a) or a DF that alternates between different values but averages to 0.5, for example alternating between equal periods of 0.2 and 0.8 DFs (for example, the workload profiles 350b-350d). As the periods of the alternating DFs increases (for example, increases from alternating between 0.2 and 0.8 DF for 50 s intervals to alternating 0.2 and 0.8 DF for 100 s and/or 250 s intervals) as shown in FIG. 3C, the corresponding degradation deviates more and more from the constant DF of 0.5 workload profile, as shown in FIG. 3D. Thus, while transient behavior of individual workload profiles 350a-350d may be different, the average DF of the workload profiles 350a-350d can be useful in projecting an overall trajectory of degradation of the device or circuit as shown in estimated degradations 360a-360d. However, an envelope of the degradation exists around the mean DF case, meaning that as the duration of the DF intervals decreases, for example into a scale of microseconds or nanoseconds (which may be more expected in real-world circuits, devices, and/or conditions) instead of seconds, the estimated degradation behavior becomes a better estimator of actual degradation of the electronic circuit. Based on such a workload averaging effect, the AWS algorithm can better perform real workload simulations as compared to previous technologies. In some implementations, the AWS algorithm may be applied to or simulate the digital waveform representing the workload for the circuit or device (or portions thereof) having high toggle-rate segments (meaning segments with the shorter DF periods, for example measured in microseconds and/or nanoseconds) while segments having toggle rates that fall below a threshold value can be simulated in another manner, such as the CA. In some embodiments, the AWS algorithm is applied to or simulates the entire digital waveform representing the workload, regardless of high or low toggle rate determinations. Adaptively analyzing and processing the digital waveform with the AWS algorithm may result in fewer simulations to obtain an end-point degradation estimation for the circuit or device, which further reduces run-time of the processing and/or analysis, as compared to the previous technologies.

Figure 4:
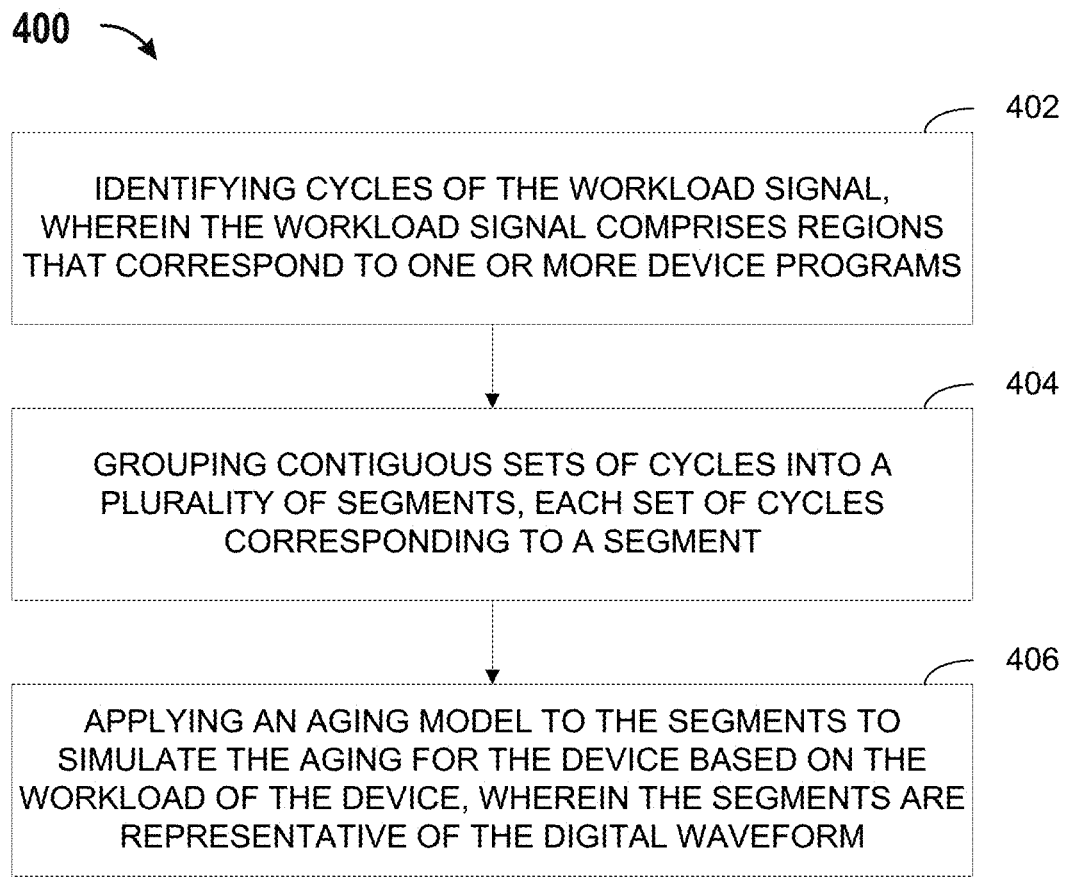
FIG. 4 provides a high level representation of a flowchart for a method of implementing a circuit aging model using an adaptive waveform splitting (AWS) algorithm described herein on a circuit for which aging information or degradation information is desired.

FIG. 4 provides a high level representation of a flowchart for a method 400 of implementing a circuit aging model using the AWS algorithm described herein on a circuit for which aging information or degradation information is desired. The method 400 may be performed on a simulated representation or model (i.e., the circuit simulation 104) of the circuit. The method 400 includes multiple high level steps, some of which will be described with more detail with respect to a process flow 500 diagram of FIG. 5. The method 400 may be carried out, for example, by one or more computing components described herein, for example, the computing system described herein. In some instances, the steps or blocks of the method 400 may occur in the sequential order presented below and in FIG. 4 or in a non-sequential order with additional or fewer steps than shown.

At block 402, the method 400 comprises identifying, in the workload signal, cycles of the workload signal. The workload signal may comprise multiple regions that correspond to one or more device programs (for example, the two distinct regions shown in the workload signal 200 of FIG. 2) for the device. The cycles of the workload signal may correspond to repeating sections of the waveform (for example, from one peak or valley to a next corresponding peak or valley, respectively, of the workload signal). In some embodiments, the different regions of the workload signal may be identified by different characteristics of the workload signal. For example, a frequency change point for the workload signal may indicate a change in the region for the workload signal or different program for the workload signal. As described in more detail with respect to FIG. 5, the cycles of the workload signal may be collected in a buffer one cycle at a time (for example, incrementing the collected cycles one at a time) or at any other number of cycles at a time.

At block 404, the method 400 comprises grouping contiguous sets of cycles into a plurality of segments. Each set of cycles may correspond to a particular segment. The segments, as described in more detail below with respect to FIG. 5, may each have a unique combination of segment parameters. The segment parameters may comprise a duty factor (DF), a frequency (FREQ), and a duration (DUR). Individual segments generated by or from continuous sets of cycles may be stored and or saved for later reference. For example, each segment of one or more portions of the workload signal may be analyzed when making a determination on or analyzing the degradation of the circuit.

At block 406, the method 400 comprises applying an aging model to the segments to simulate the aging for the circuit based on the workload of the circuit. In some embodiments, the method 400 may use the segments in conjunction with the aging model to determine an amount of degradation for each of the segments as it applies to the circuit.

Figure 5:
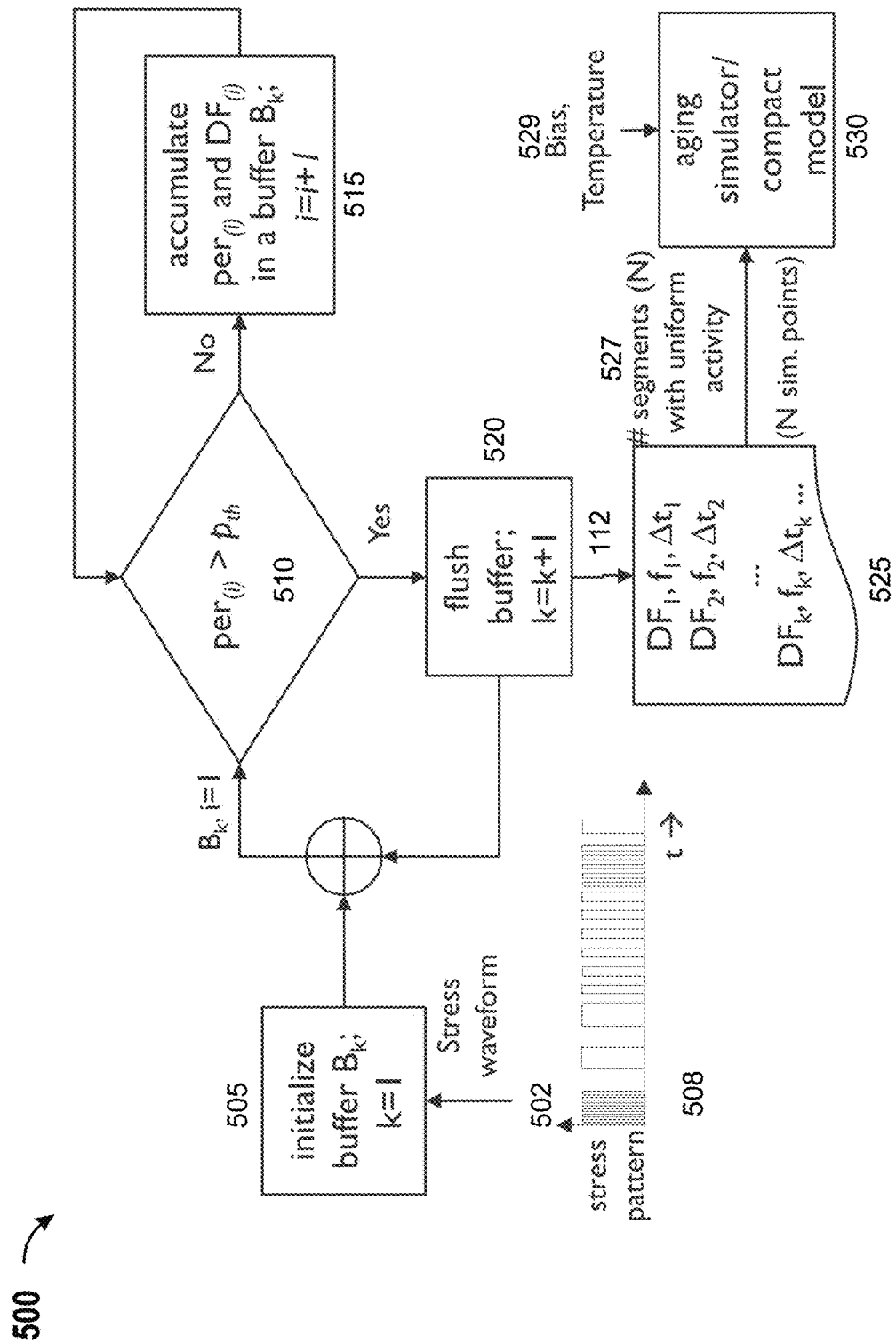
FIG. 5 provides a process flow diagram that further details sampling a stress waveform (corresponding to the workload signal) to generate segments for use with an aging simulator model.

As introduced above, FIG. 5 provides a process flow 500 diagram that further details sampling a stress waveform 508 (corresponding to the workload signal 202) to generate segments 112 for use with an aging simulator model 530. Similar to the blocks of FIG. 4, the blocks of the process flow 500 may be carried out, for example, by the computing system described herein. In some instances, the steps or blocks of the process flow 500 may occur in the sequential order presented below and in FIG. 5 or in a non-sequential order with additional or fewer steps than shown.

The process flow 500 begins with receiving, at an input 502, the stress waveform 508. The input 502 may receive one or more cycles of the stress waveform 508 for sampling. For example, when a single cycle of the stress waveform 508 is sampled, the sampled cycle of the stress waveform 508 may be stored in a buffer 505. The buffer 505 may begin with a counter k that is initialized to one. The sampled cycle of the stress waveform 508 from the input 502 may be stored in the buffer 505, and a period (for example, a length) of the sample cycle stored in the buffer 505 may be compared to a threshold period at block 510. If the period of the buffer 505 is less than the threshold period, then the sampled cycle(s) stored in the buffer 505 may be accumulated with additional sampled cycles of the stress waveform 508 from the input 502. If the period of the buffer 505 is greater than or equal to the threshold period, then the sampled cycle stored in the buffer 505 may be saved as a segment 112, as described in further detail below.

When the sampled cycle in the buffer is accumulated with the cycle(s) in the accumulated cycles in the buffer 505 at 515, the period of the accumulated sample(s) in the buffer 505 may again be compared to the threshold period at 510. This process of accumulating additional sampled cycles of the stress waveform 508 in the buffer 505 (for example, one at a time) will continue until the period of the accumulated cycles in the buffer 505 exceeds the threshold period at the block 510 or the period of the sampled cycle exceeds the threshold period. In some embodiments, the threshold period will be set at a value such that variations with respect to segment parameters for segments generated based on each set of buffered cycles are close to or within threshold ranges of average values for the segment.

Once the period of the sampled cycle(s) in the buffer 505 exceeds the threshold period, the buffer 505 is flushed, the buffer counter k incremented by one, and the sampled cycles from the buffer 505 are stored as a (unique) segment 112 in a segment storage 525. The computing system may determine values for the unique segment parameters for the segment 112 stored in the segment storage 525. In this manner, the computing system may continuously sample the stress waveform 508 to generate a number of segments for the stress waveform 508. For example, the entirety of the stress waveform 508 may be sampled in this manner to identify all segments 112 of the segment storage 525 that make up the stress waveform 508. In some embodiments, the segments generated based on sampling the stress waveform 508 may be representative of a digital waveform corresponding to the stress waveform 508.

In some embodiments, the number and characteristics of the samples that form each segment in the segment storage 525 differ between segments 112; therefore, each segment 112 may have different segment parameters from every other segment in the segment storage 525. For example, each segment 112 may have a different duty factor (DF) (for example, average duty factor for the segment) from each other segment 112 in the segment storage 525. In some instances, each segment 112 also has a different frequency (f) and/or duration ($\Delta t$) from each other segment 112. The frequency value for each segment 112 may correspond to an average frequency for that segment 112, similar to the duty factor. Because each segment 112 of the segment storage 525 is unique, the number of segments 527 in the segment storage 525 may correspond to or represent a number of simulation points. The aging simulator model 530 may apply an aging model to a bias and/or temperature input 529 (real or simulated) and the simulation points of the segment information from the segments 112 in the segment storage 525. Thus, the process flow 500 may sample the entirety of the stress waveform 508 to generate a plurality of segments 112 representative of a digital waveform corresponding to the stress waveform 508. These segments 112, each having unique segment parameter values, may represent unique simulation points to which the aging simulator model 530 is applied. In some embodiments, applying the aging simulator model to the segments 112 from the segment storage 525 generates results of degradation specific to the simulation point to which the aging simulator model 530 is applied. Thus, by applying the aging simulator model 530 to each of the segments 112 in the segment storage 525, the aging simulator model 530 generates degradation values for each segment.

Figure 6:
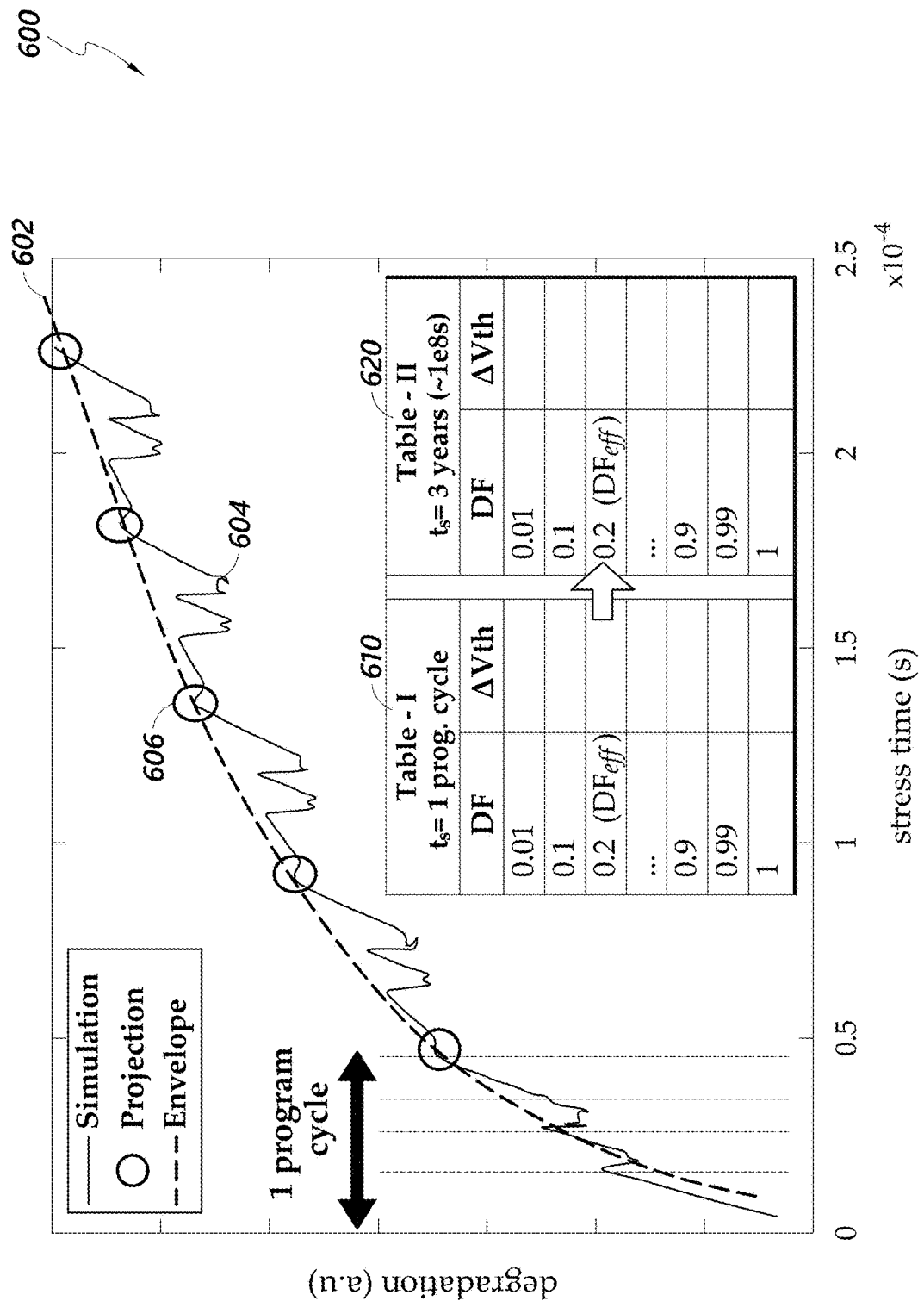
FIG. 6 shows a graph of a degradation plot showing an envelope (or effective degradation behavior) for a simulated electronic circuit and waveform combination (not shown).

Because each segment 112 in the segment store 525 has a unique duty factor, each corresponding degradation value can be stored in a lookup table relative to the corresponding duty factor. Thus, the table can include a column of duty factor values and a corresponding column of degradation values associated with the duty factor value. For example, FIG. 6 shows a graph of a degradation plot 600 showing an envelope 602 (or effective degradation behavior) for a simulated electronic circuit and waveform combination (not shown). The degradation plot 600 shows stress times on the x-axis having times between zero and $2.5 \times 10^{-4}$ seconds and degradation on the y-axis having values if atomic units or V. The degradation plot 600 also includes a simulated degradation plot 604 and projections 606 along the envelope 602. The projections 606 may correspond to extrapolated degradation values generated based on the linear relationship between the calculated short-term degradation values. The simulated degradation plot 604 may correspond to the plot generated from random sampling for a number of cycles of the workload.

FIG. 6 also includes two lookup tables, a first lookup table 610 representing short-term aging of a single program cycle or a small number of program cycles for the simulated electronic circuit and a second lookup table 620 representing a longer-term aging of a lifetime for the simulated electronic circuit, where pre-characterization will only occur with a uniform duty cycle and frequency. As described above with respect FIG. 5, the lookup table 610 can be populated based on sampling the waveform of the simulated electronic circuit and waveform combination to generate the segments with unique duty factors and then identifying corresponding degradation amounts or values for each unique segment. For example, the lookup table 610 may be populated with degradation amounts or values (for example, in amounts of change ($\Delta V$) caused or resulting from the corresponding segment duty factor. Thus, the segment 112 having the duty factor of 0.01 may have a $\Delta V$ of x while the segment having the duty factor of 0.2 may have a $\Delta V$ of y, and so forth. In some instances, while the duty factors of different segments 112 do not overlap, the $\Delta V$ degradation changes may be duplicated between one or more pairs of duty factors and segments.

The lookup table degradation values in the first lookup table 610 for the short-term duration can then be extrapolated into the long-term degradation values in the second lookup table 620. For example, based on the short term degradation value for a particular duty factor value, an analysis can be performed to determine how much or how many times each duty factor (i.e., segment) will be repeated over the lifetime of the simulated circuit. Based on the number of time each duty factor will be repeated in the lifetime of the simulated circuit (or other long term duration), the change in degradation from the short term lookup table 610 can be extrapolated to the change in degradation for the long term lookup table 620 for the corresponding duty factor value because of the linearity of the degradation and uniform duty factor with respect to the workload signal. The determination of number of times a duty factor is repeated over a particular amount of time or the lifetime of the simulated circuit can be determined using any practical means or methods. More specifically, by simulating only one or a few programs or scenarios, an effective DF ($DF_{eff}$) can be extracted using table 610 and then mapped to the long-term degradation with the $DF_{eff}$ entry in table 620. For example, many application programs or scenarios have typical workload profiles that are repeated periodically over its lifetime. The long-term extrapolation method shown in FIG. 6 uses the look-up table 610 (for short-term, i.e., one or a few program cycles) and look-up table 620 (for long-term degradation (e.g. 3 years)) as a function of uniform activity or DF. Then the simulated short-term degradation under real workload is interpolated to get the corresponding effective DF ($DF_{eff}$) in table 610 which is mapped to long-term degradation with the corresponding $DF_{eff}$ entry in 620. Effectively, at the end of each projection 606, the degradation (i.e., the $\Delta Vth$ in table 610) is identified from the graph 600 and used to identify the corresponding DF, which becomes the effective DF. Then that effective DF can be mapped to the table 620 to identify the corresponding long-term degradation.

Thus, when the circuit experiences or runs a random program that generates a particular degradation waveform and this program is repeated, the computing system can perform the degradation simulation for segments generated from sets of cycles of the random program workload for one or a few of these programs cycles. The computing system can identify an effective duty factor for each generated segment based on the aging workload model to identify the short term (one or a few program cycles) degradation of the random program workload. This short-term degradation can then be extrapolated to identity the long-term degradation based on the uniform duty factor.

Figure 7A:
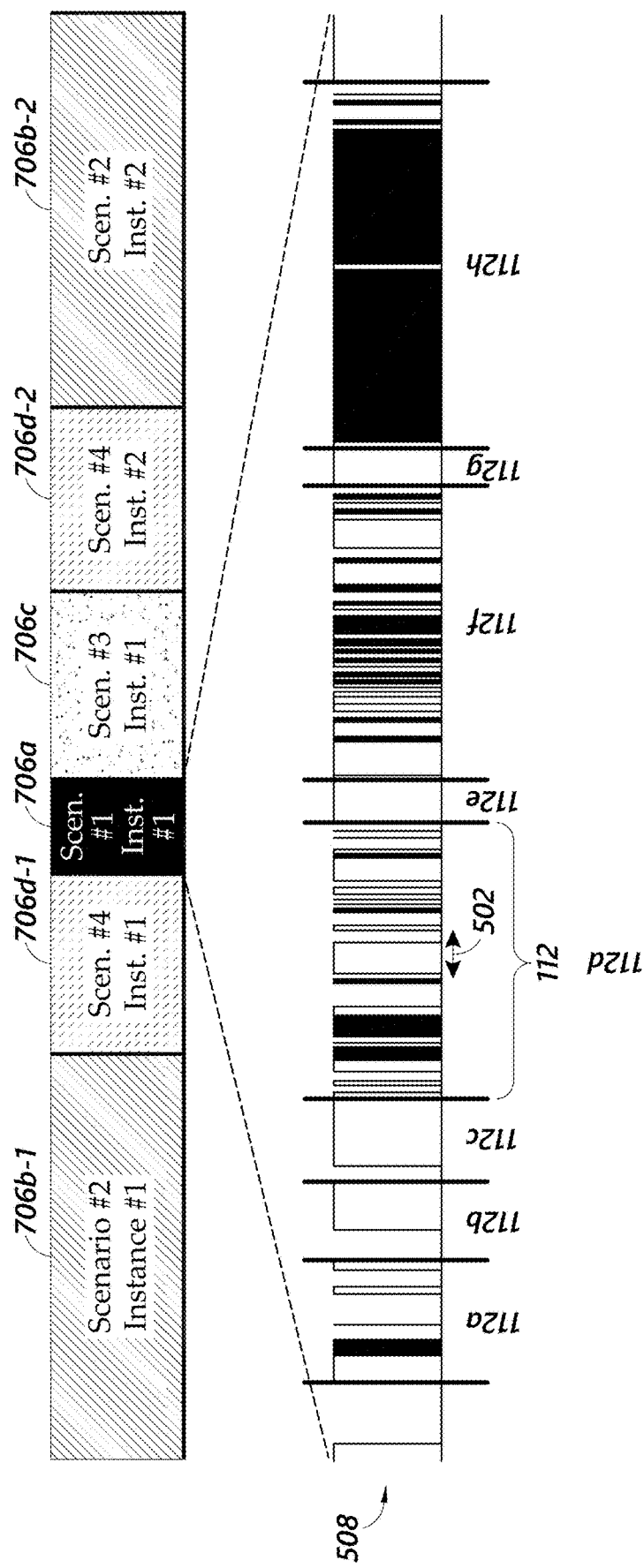
FIG. 7A depicts a breakdown of scenarios into segments and cycles.

FIG. 7A shows a representation of the stress waveform 508 as it relates to different repeatable scenarios 706 and instances of a digital representation of the stress waveform 508. In some embodiments, the scenarios are generated based on aggregating a number of contiguous segments. In some embodiments, one or more of the scenarios or the number of contiguous segments correspond to aging models, for example based on start times of the scenarios. For example, the aging models may determine an amount of degradation caused by the scenarios based on when the scenario starts. In some instances, for each of the scenarios, one of the aging models is applied to the scenario to calculate aging for the device based on a pre-defined relationship between degradation of the circuit and the workload of the circuit characterized by values for a combination of scenario parameters. In some embodiments, the relationship is a linear or linearity based relationship. In some embodiments, the relationship is characterized by the scenario parameters. The combination of scenario parameters may comprise a scenario duty factor, a scenario frequency, and a scenario duration. In some embodiments, the scenario parameter values may be averages of the corresponding values for the segments that form the scenario. The individual segments within the scenarios may still maintain their particular values for the combination of segment parameters. As described above with respect to FIG. 5, the computing system herein may sample stress waveform 508 by cycles of the stress waveform 508 (as described relative to FIG. 5) to generate one or more segments 112. The segments 112 may be used to determine the degradation values for the circuit caused by the segments 112 and extrapolate those short term values to long term values and/or a lifetime of the circuit.

FIG. 7A shows how the segments 112 generated from the cycles of the stress waveform 508 can correlate to scenarios 706. A scenario 706 may comprise a collection of consecutive and/or non-consecutive segments 112. In general, each selected scenario is repeated often and at least once during the duration of the potentially long (days, weeks or even years) overall stress waveform 508. Repeated scenarios, for example 706*a*-1 and 706*a*-2, may comprise the same segments 112 in the same order every time they appear in the stress waveform 508, though, in general, parameters may be present in the scenario definition. In that case, depending on the specific parameter value, the segments 112 in different instances of the same scenario may occur in different orders. Those orders may still be deterministically defined by the parameter values. The FIG. 7A includes four different scenarios, a scenario #1 706*a*, scenario #2 706*b*, scenario #3 706*c*, and scenario #4 706*d*. In some instances, scenarios are formed based on established criteria/constraints, for example energy and/or power dissipation versus execution time as described in Francky Cathoor, et al., System-Scenario-based Design Principles and Applications, pp. 7-97 (2020), which is incorporated herein by reference. In general, the scenarios may be defined in an N-dimensional objective space where different metrics, assigned to separate objective axes are established, like energy, maximal power, footprint, throughput latency and so on. The meaningful/useful segment mappings (ordered sequences of segments on the execution platform including processor allocation and assignment) may be characterized in terms of their metrics and those who are sufficiently close to each other in terms of the distance (e.g. Manhattan distance) in the N-dimensional objective space will be clustered in the same scenario. Based on profiling of realistic applications, the expected order of scenario instances may then be established to arrive at the final scenario sequence. In the context of disclosed invention, an important metric to be included during the scenario clustering may be the amount of degradation due to aging on the platform for the associated segment mapping. Specifically, FIG. 7A shows that the scenario #1 706*a* includes at least eight segments 112*a*-112*h*. Each of the other scenarios 706 may include one or more of a different set of segments 112, a different number of segments 112, or a different order of segments (based on the scenario parameters) 112. In view of the linearity between the stress waveform 508 and the degradation caused by or associated with the segments, each of the repeated scenarios (for example the scenarios 706*b*-1 and 706*b*-2) may have corresponding (or substantially corresponding) degradation values because the same scenarios should have the same impact (i.e., degradation and/or aging) on circuit degradation and aging analysis. For example, the scenario #2, instance #2 706*b*-1 would be expected to have the same degradation value(s) as scenario #1, instance #2 706*b*-2. Similarly, the scenario #4, instance #1 706*d*-1 would be expected to have the same degradation value(s) as scenario #4, instance #2 706*d*-2. As discussed herein, creating scenarios 706 based on collections or sets of segments 112 may further simplify propagation or extrapolation of short-term degradation values to long-term periods, for example representing easily identifiable and repeating portions of the stress waveform 508. Thus, identifying scenarios 706 and an associated degradation value can help improve speed of determination of the degradation and/or aging of the circuit caused by the stress waveform 508 over the lifetime of the circuit.

The scenario #2 706*b* and the scenario #4 706*d* are repeated. Scenario #2 instance #1 706*b*-1 is shown on the left and scenario #2 instance #2 706*b*-2 is shown on the right. Scenario #4 instance #1 706*d*-1 is shown between the scenario #2 instance #1 706*b*-1 and the scenario #1 706*a*, while the scenario #4 instance #2 706*d*-2 is shown between the scenario #3 706*c* and the scenario #2 instance #2 706*b*-2. The first instance of the scenario #2, instance #1, 706*a*-1 is shown on the left and the second instance of the scenario #2, instance #2, 706*a*-2 is shown on the right. Thus, for the sequence of scenarios 706 shown in FIG. 7A, the degradation attributed to the scenarios 706 may be equal to the sum of: the degradation of the scenario 706*a*, the degradation of the scenario 706*b* multiplied by 2 (for 706*b*-1 and 706*b*-2), the degradation of the scenario 706*c*, and the degradation of the scenario 706*d* multiplied by 2 (for 706*d*-1 and 706*d*-2). Accordingly, the scenarios 706 can simplify the determination of the stress waveform 508 or a portion thereof. In some instances, the computing system evaluates the degradation of the circuit based on a set of aging models for a set of scenarios occurring in an arbitrary sequence over a duration of the digital waveform.

Figure 7B:
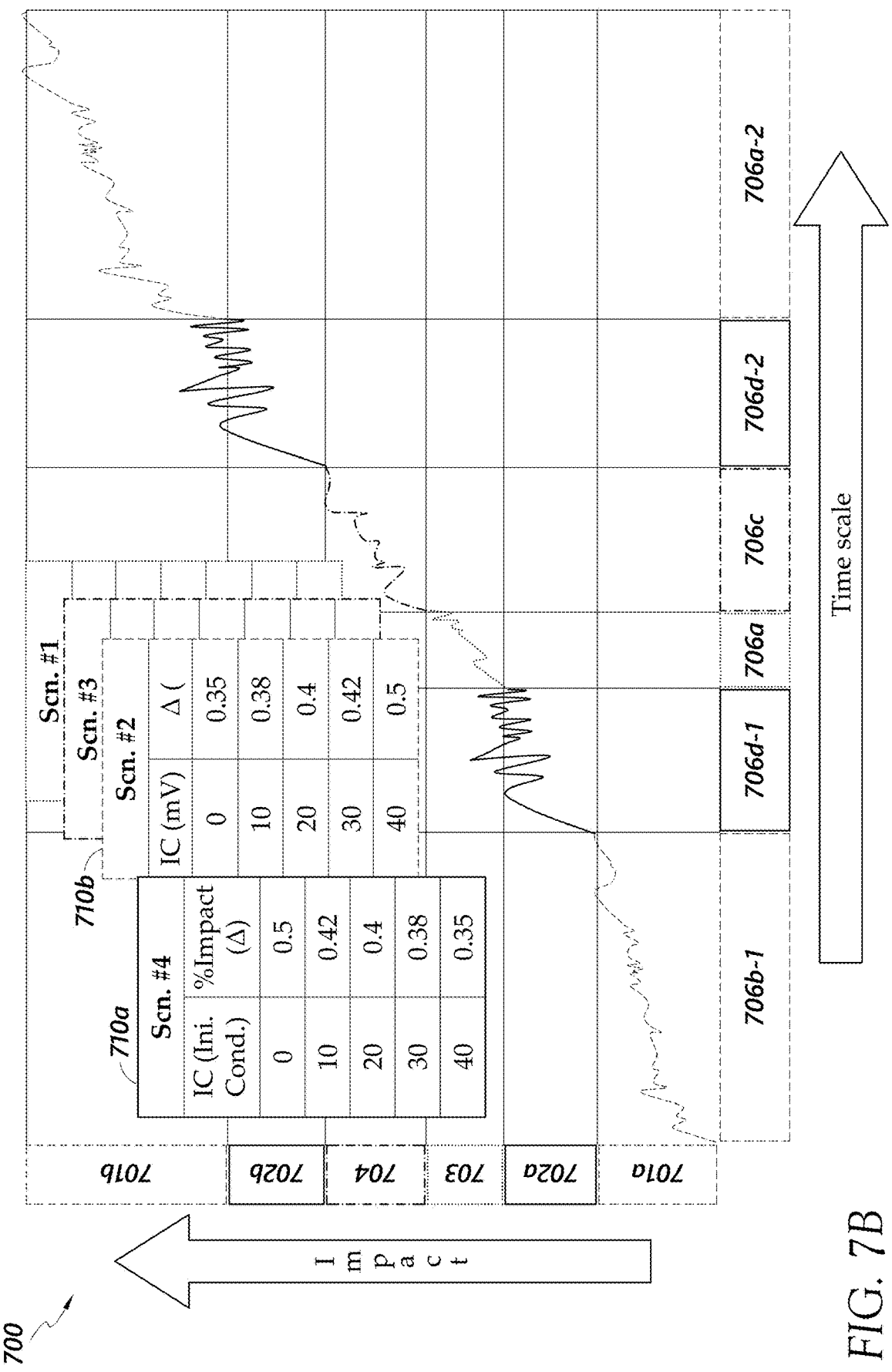
FIG. 7B depicts a graph showing how the scenarios and instances of FIG. 7A can have different impacts on a cumulative degradation of the circuit caused by the stress waveform.

In some instances, when the scenario 706 and/or corresponding instance occurs in the lifetime of the circuit impacts the degradation causes by the scenario 706. For example, FIG. 7B depicts a graph 700 showing how the scenarios 706 and instances of FIG. 7A can have different impacts on a cumulative degradation of the circuit caused by the stress waveform 508. The graph 700 shows a time scale on the x-axis, specifically showing the sequence of scenarios 706 from FIG. 7A and an impact of the scenarios 706 from FIG. 7A along the y-axis. The graph 700 also includes a line 710 representing the impact of the scenarios on the degradation of the circuit.

In some instances, as shown in FIG. 7B and represented by the line 710, the repeated scenarios 706 may have different impacts on the degradation of the circuit dependent on when the circuit experiences those particular scenarios. For example, the scenario #2, instance #1 706b-1 may have a smaller impact 701a on the degradation of the circuit than the scenario #2, instance #2 706b-2 impact 701b. More specifically, the impact 701a is smaller than the impact 701b, as represented by the shorter length of the impact 701a along the y-axis as compared to impact 701b. Similarly, the scenario #4, instance #1 706d-1 may have a similar impact 702a on the degradation of the circuit with the scenario #4, instance #2 706d-2 impact 702b. More specifically, the impact 702a is similar to the impact 702b, as represented by the similar lengths of the impact 702a and the impact 702b along the y-axis.

FIG. 7B also shows tables representing the impact (or change) of degradation of particular scenarios 706 as related to the initial condition of the degradation for the scenario. The degradation could be transistor level degradation or cell timing degradation. The tables are characterized by using a fixed amount of initial offset to the degradation parameter during simulation. For example, the table 710a shows that when the scenario #4 706d starts at a degradation value of 0 mV, the impact of the scenario is 0.5, while the scenario #4 706d has an impact of 0.38 when it starts at a degradation value of 30 (for example, mV), and so forth. In some instances, the impact of the scenario 706 may increase consistently as the initial condition (for example, time when the scenario starts) increases, as shown in the table 710b. Similarly, the impact of the scenario 706 may decrease consistently as the initial condition (for example, degradation amount or value when the scenario starts) increases, as shown in the table 710a. Thus, the tables 710a and 710b shows how the impact of a particular scenario can change dependent on when in the degradation the scenario occurs. For example, as shown in table 710a, as the degradation initial condition increases (meaning that as the amount of degradation that exists increases with respect to when the scenario is run, the further impact that the scenario has on the degradation decreases (from 0.5 at the initial condition of 0 to 0.35 at the initial condition of 40 mV). Alternatively, or additionally, the impact of the scenario 706 on the degradation may fluctuate (increase, decrease, and/or stay the same) as the initial condition of degradation increases. The tables 710 working with a parameterized approach may be applied when the stress waveform 508 comprises multiple scenarios being applied in arbitrary sequence. The size of the tables 710 may depend on a desired amount of granularity in the degradation estimation. However, if the stress waveform 508 only includes a single scenario, which keeps repeating over, then the short-long term projection look up tables described with respect to FIG. 6 may be applied to determine the degradation.

Furthermore, the systems and methods herein can apply the AWS algorithm beyond boundaries of alternating periods (or similar waveform regions) described above or corresponding numerical values. Such variability in application of the AWS algorithm to segments of varying characteristics (for example, DF, frequency, and the like) may improve compressibility and scalability along with efficiency and accuracy of predictions, as compared to the previous systems and methods. For example, the previous systems and methods grouped consecutive signal regions that feature a similar frequency and DF numbers and occupy a duration Δt. These approaches distinguish the intervals or groups based on the numerical value of its signal characteristics (for example, the frequency or DF). For example, if two cycles with different DFs (say 0.3 and 0.55) are separated beyond threshold amount limit (say, 0.1), those 2 cycles will have to be simulated in cycle-accurate manner, which will require longer simulation time. FIG. 2 shows a comparison of the AWS algorithm as compared to previous systems and methods relative to the corresponding digital waveform.

In real-world applications, different circuits and devices may have expected workload profiles that have repeating portions. For example, certain application specific integrated circuits (ASICs) may have given applications that are repeated over time, for example, daily, weekly, monthly, annually, and so forth. Because the activities are repeated, degradation over a long term period can be extrapolated based on analysis of a shorter term period, where the degradation for the shorter term period is determined and then extrapolated for the long term period. These example time periods for small and long term periods are examples only, where the short term periods can be much shorter (for example, seconds or minutes).

The methods and systems herein greatly improve the time required to run simulations to generate the degradation predictions described herein using groups of signal regions of the workload profile and/or digital waveform that extend beyond the boundaries of numerical values of a particular signal characteristic (for example, include multiple frequencies, DFs, and so forth). Over its lifetime, the chip (or circuit or device) operation may be divided into a number of recurring intervals (RIs). One or more of these RIs may be repeated one or more times over the lifetime of the chip. Thus, the repeated RI may be identical or substantially identical or about identical with one another. One or more programs may run (at least in part) over a given RI. The workload signal for each of the programs may be split into one or more segments such that each segment has definite and/or unique signal characteristics with respect to the degradation. As introduced above, splits between adjacent segments are not limited to requiring differences in numerical values between the segments, and a single segment may include signal portions of different frequencies and/or DFs.

Figure 8:
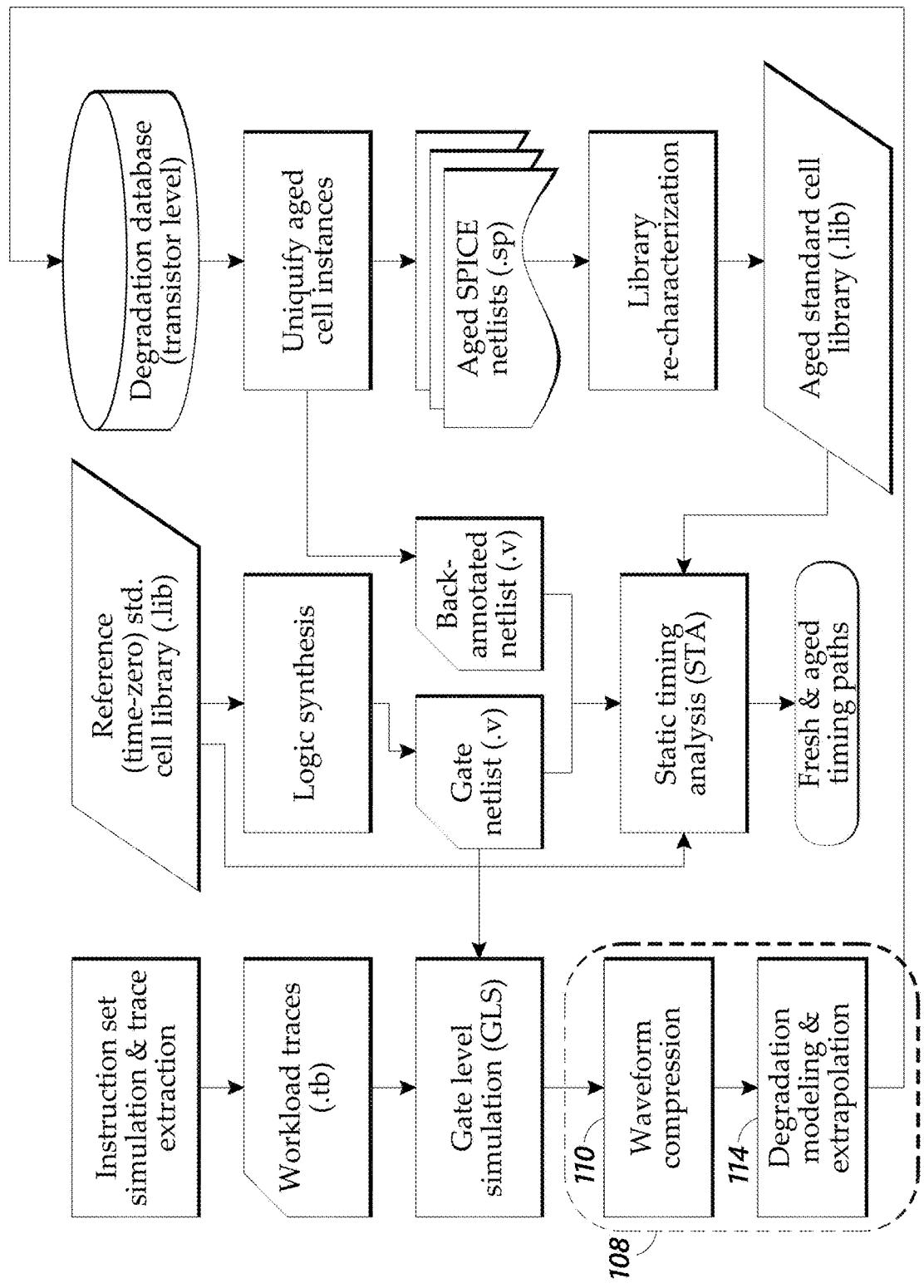
FIG. 8 depicts a representative circuit level simulation flow for workload dependent aging analysis for electronic circuits.
Figure 9:
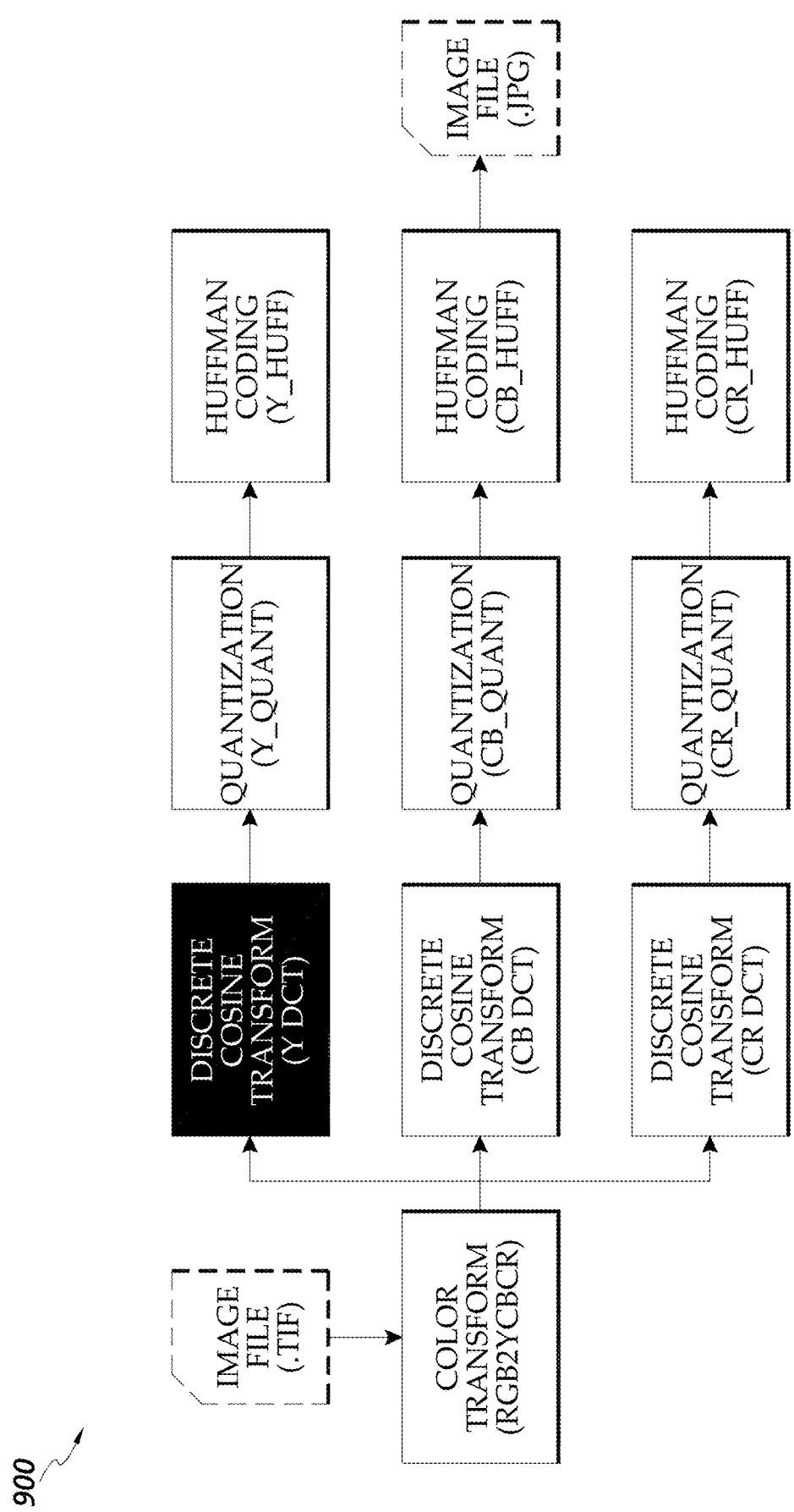
FIG. 9 shows a block diagram of the components for the jpeg encoder integrated circuit (IC) including a number of discrete cosign transfer (DCT) blocks.

FIG. 8 depicts a representative circuit level simulation flow 800 for workload dependent aging analysis for electronic circuits. The flow 800 may indicate how the AWS algorithm described above can be implemented in front end design processes of electronic circuits and devices. For example, the flow 800 may employ static timing analysis (STA) to generate timing paths for the electronic circuits and devices. A reference library provides inputs to logic synthesis module and an STA module. The logic synthesis module has an output to a gate level simulation. The gate level simulation uses workload traces based on simulation and trace extraction to simulate an electronic circuit. The waveform compression generator 110, described above, generates a compressed waveform based on the segments 112, for example using the AWS algorithm, which are then modeled and extrapolated by the degradation modeling and extrapolation 114, which may generate the lookup tables described above. The use of compressed waveforms (for example, as generated by the AWS algorithm) reduces time and computational overhead as compared to the full simulations performed by the previous technologies. The degradation modeling and extrapolation 114 will identify degradation values for each simulation point and populate the lookup tables based on the identified degradation values for particular duty factors. These lookup tables are stored in a transistor level degradation database, which is used by the STA module to generate the fresh and aged timing paths for the electronic circuit. Waveform compression generator 110 and the degradation modeling and extrapolation 114 may be performed individually for each component of the electronic circuit. The determined and propagated degradation values may be applied to the same components (for example, same components in the electronic circuit may experience same or similar degradation, so the degradation values for one component can apply to other same components in the circuit). Thus, the STA can be performed for the electric circuit using accurately calculated degradation values and not simply worst case or conservative degradation values. By populating the degradation database with accurately calculated degradation values for circuit components, the STA flow can remain generally the same with only the degradation information changing relative the remainder of the flow. For example, the components or processing in the block 810 may operate as a black box to the flow 800, where output from the gate level simulation, comprising specifics of the simulation, is provided to the black box block 810 and the degradation database is populated by the output of the black box block 810, where the degradation values output by the black box block 810 have improved accuracy as compared to those generated by the previous technologies The STA is then able to utilize the degradation stored in the degradation as determined above in the front end design of the electronic circuit and/or device. Such a flow of FIG. 8 can be integrated into or applied to components in an integrated chip (IC), for example as part of the discrete cosine transform (DCT) block(s) of the jpeg encoder shown in FIG. 9. FIG. 9 shows a block diagram of the components for the jpeg encoder IC 900 including a number of DCT blocks. The DCT circuit may accept a 24-bit raw image file in an RGB format and perform image compression thereon. The DCT design may have approximately 140,000 gates when mapped using a commercial 28 nm standard cell library. The aging analysis, as introduced above with respect to FIGS. 4 and 5, for over 30 k NOR2 gates in the DCT circuit design shows an expected correlation between the degradation of top and bottom transistors of the DCT circuit design.

Figure 10:
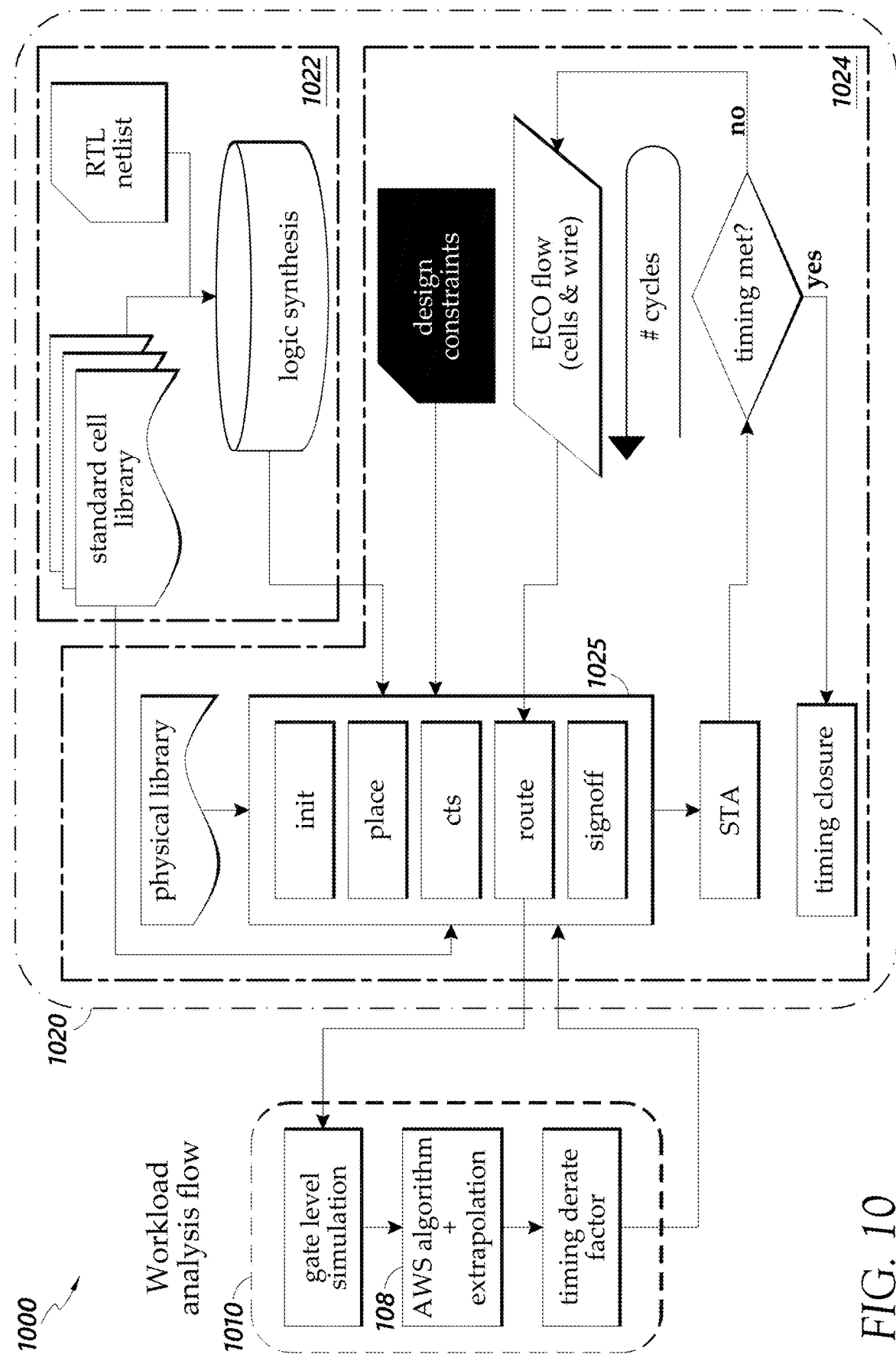
FIG. 10 provides a physical flow that integrates a workload analysis flow using the AWS algorithm and degradation modeling and extrapolation with an existing application specific integrated circuit (ASIC) (or similar) design flow FIG. 11 provides an example of a flow of an in-situ mitigation monitor incorporating the AWS algorithm and degradation modeling and extrapolation introduced above. The in situ monitor may assist with mitigation of circuit or device aging.

FIG. 10 provides a physical flow 1000 that integrates a workload analysis flow 1010 using the AWS algorithm and degradation modeling and extrapolation (corresponding to the degradation model generator 108 of FIG. 1) with a conventional digital design flow 1020 in the generation of a digital circuit design. The flow 1000 shows that the workload analysis flow 1010 with the AWS algorithm and corresponding degradation extrapolation integrates seamlessly with existing industry standard flows, for example the conventional digital design flow 1020. The workload analysis flow 1010 may comprise a functional block that indicates simulations and corresponding information. A timing derate factor block may comprise timing data factor data generated by the AWS algorithm and corresponding degradation extrapolation block 108. The conventional digital design flow 1020 may comprise a logic design flow 1022 and a physical design flow 1024, which comprises a place and route flow 1025. In some instances, the optimizations are performed during/after the routing stage of the place and route flow 1025.

The block 1025 represents a place and route block which performs an actual physical implementation after logic design of the logic design flow 1022 is complete. The input to the block 1025 include a gate netlist obtained from logic synthesis of the logic design flow 1022, a physical library (for example in a library exchange format (lef)) that comprises a specification for representing a physical layout of the digital circuit being designed by the digital design flow 1020. This block 1025 may comprise design constraints to do various optimizations, for example timing, area, and power. The block 1025 may be complete once static timing analysis (STA), similar to the STA discussion above, confirms timing closure or no timing violations exist for the designed digital circuit. In some instances, this process is performed iteratively.

In the physical flow 1000, the AWS algorithm and corresponding degradation extrapolation 108 can generate the one or more timing derate factors that are more accurate than those provided by existing technologies. These improved timing derate factors can enable improved routing of the physical flow 1000 and help provide more realistic and accurate timing optimization of the ASIC. Thus, the AWS algorithm and degradation modeling 108 can assist with routing and signoff of the ASIC flow. The AWS algorithm and degradation extrapolation 108 thus enables improved margins in the ASIC flow, which can lead to faster timing sign off. Furthermore, because the margins are improved (i.e., reduced), fewer buffers and corresponding components may be required, thereby saving physical area in the ASIC and providing corresponding benefits.

The workload analysis flow 1010 may comprise a gate level simulation, similar to the gate level simulation described above with respect to FIG. 8. The gate level simulation may receive waveform information from a physical design tool, being configured to generate simulation data for one or more components of the digital circuit design. The workload analysis flow 1010 may further comprise a circuit degradation and extrapolation tool. The circuit degradation and extrapolation tool may receive the simulation data from the gate level simulation, being configured to generate optimization information comprising timing derate factors that are provided back to the physical design tool for final circuit routing. As shown in FIG. 10, the gate level simulation further receives circuit information from the physical design tool. The physical design too may include a place and route tool. In some instances, the place and route tool includes a circuit routing tool and the optimization information is provided directly to the final circuit routing. The physical design tool may also receive a gate netlist from the block 1022, a specification representing a physical layout of the digital circuit design from a library, and design constraints from a logic design tool of the physical design flow 1024. In some instance, the digital circuit design is a design for an application specific integrated circuit (ASIC).

Figure 11:
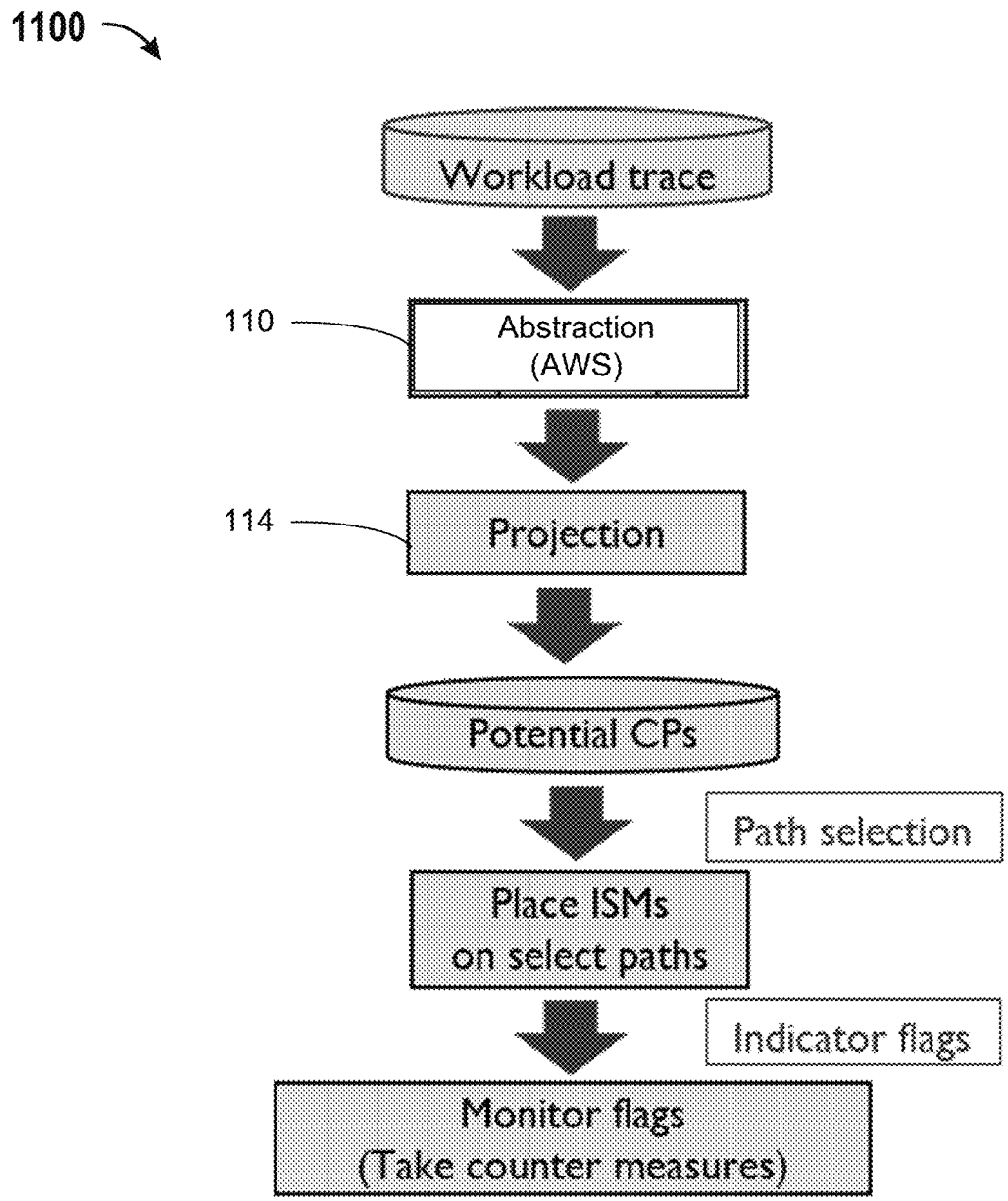

FIG. 11 provides an example of a flow 1100 of an in-situ mitigation monitor incorporating the AWS algorithm and degradation modeling and extrapolation introduced above. The in situ monitor may assist with mitigation of circuit or device aging. The in situ monitor may be placed in a path that is expected to have timing violations in its lifetime. For example, the in situ monitors can set a flag when a timing violation is expected or predicted in the path in which the in situ monitor is placed. The AWS algorithm and degradation modeling and extrapolation can be integrated with such critical paths to enable adjustment of timing of the path in which the in situ monitor is placed to avoid the predicted timing violation. The abstraction 1104 may be generated by the waveform compression generator 110, and the projection 1106 may be generated by the degradation modeling and extrapolation 114 of FIG. 1. In combination, the abstractions and the projections can be used in the in situ monitors. Thus, the disclosed technology can improve in situ monitoring, enabling correcting one or more parameters or aspects of a chip or circuit while in operation.

As introduced above, the disclosed technology enables computing systems to apply the AWS algorithm based waveform compression of the workload signal and corresponding degradation modeling and extrapolation. These computing systems implementing the waveform compression and degradation value generation described herein operate more efficiently than those implementing the previous technologies and generate degradation values that are more accurate than corresponding results of the previous technologies. For example, the timing analysis performed by the flow 800 using the AWS compression and the degradation modeling and extrapolation described above may result significant reduction in timing violations for circuits that are modeled with the disclosed technology as compared to previous technologies. The workload dependent approach of the disclosed technology may reduce the timing violations by greater than 30% as compared to the previous technologies. By providing more accurate degradation and aging predictions for electronic circuits, the electronic circuits can be designed with improved characteristics. For example, the reduction in timing violations described above enables electronic circuit design for circuits having more margin. Furthermore, the improvements in processing time (for example, the reduced time and overhead required to identify the degradation values for the electronic circuit using the disclosed technology) enables improved STA, for example by the flow 800. Accordingly, a more complete STA can be performed for the workload signal based on the compressed waveform as generated by the waveform compression generator 110 (i.e., the segments 112) from the AWS algorithm for the whole lifetime of the circuit. The degradation modeling and extrapolation 114 provides results that create more margin for the circuit in a shorter amount of time, enabling improved circuit design in shorter time periods. Thus, the AWS algorithm and corresponding degradation modeling and extrapolation can improve predicted or estimated front end circuit design flows as well as physical ASIC flows and in situ monitors.

In some embodiments, the various modules described herein may be implemented by either hardware or software. For example, the degradation model generator 108 may be implemented by either hardware or software. Software modules may be stored on a component of a corresponding device itself (for example, a local memory or a mass storage device), or on computer readable storage media or other component separate from or remote to the device and in communication with the device.

The computing systems described herein may comprise, for example, a computer that is IBM, Macintosh, or Linux/Unix compatible or a server or workstation or a mobile computing device operating on any corresponding operating system. In some embodiments, the computing system interfaces with a smart phone, a personal digital assistant, a kiosk, a tablet, a smart watch, a car console, or a media player. In some embodiments, the computing system may comprise more than one of these devices. In some embodiments, the computing system includes one or more central processing units ("CPUs" or processors), I/O interfaces and devices, memory, a mass storage device, a multimedia device, a user interface module, and an internal bus.

The CPU may control operation of the device. The CPU may also be referred to as a processor. The processor may comprise or be a component of a processing system implemented with one or more processors. The one or more processors may be implemented with any combination of general-purpose microprocessors, microcontrollers, digital signal processors ("DSPs"), field programmable gate array ("FPGAs"), programmable logic devices ("PLDs"), controllers, state machines, gated logic, discrete hardware components, dedicated hardware finite state machines, or any other suitable entities that can perform calculations or other manipulations of information.

The I/O interface may comprise a keypad, a microphone, a touchpad, a speaker, and/or a display, or any other commonly available input/output ("I/O") devices and interfaces. The I/O interface may include any element or component that conveys information to the user of the device (for example, a client or customer, a vendor, the entity hosting the virtual environment and selling items, or another entity) and/or receives input from the user. In one embodiment, the I/O interface includes one or more display devices, such as a monitor, that allows the visual presentation of data (for example, the virtual environment) to the client. More particularly, the display device provides for the presentation of GUIs, virtual environments, application software data, websites, web apps, and multimedia presentations, for example.

In some embodiments, the I/O interface may provide a communication interface to various external devices. For example, the computing system is electronically coupled to a network, which comprises one or more of a LAN, WAN, and/or the Internet. Accordingly, the I/O interface includes an interface allowing for communication with the network, for example, via a wired communication port, a wireless communication port, or combination thereof. The network may allow various computing devices and/or other electronic devices to communicate with each other via wired or wireless communication links.

The memory, which includes one or both of read-only memory (ROM) and random access memory ("RAM"), may provide instructions and data to the processor. For example, data received via inputs received by one or more components of the device may be stored in the memory. A portion of the memory may also include non-volatile random access memory ("NVRAM"). The processor typically performs logical and arithmetic operations based on program instructions stored within the memory. The instructions in the memory may be executable to implement the methods described herein. In some embodiments, the memory may be configured as a database and may store information that is received via the user interface module or the I/O interfaces and devices.

The computing system may also include the mass storage device for storing software or information (for example, the generated segments, generated lookup tables, received workload signals, and so forth). Software shall be construed broadly to mean any type of instructions, whether referred to as software, firmware, middleware, microcode, hardware description language, or otherwise. Instructions may include code (for example, in source code format, binary code format, executable code format, or any other suitable format of code). The instructions, when executed by the one or more processors, cause the processing system to perform the various functions described herein. Accordingly, the computing system may include, for example, hardware, firmware, and software, or any combination therein. The mass storage device may comprise a hard drive, diskette, solid-state drive, or optical media storage device. In some embodiments, the mass storage device may be structured such that the data stored therein is easily manipulated and parsed.

The bus may couple the various components of the computing system. The bus may include a data bus, for example, as well as a power bus, a control signal bus, and a status signal bus in addition to the data bus. In different embodiments, the bus could be implemented in Peripheral Component Interconnect ("PCP"), Microchannel, Small Computer System Interface ("SCSI"), Industrial Standard Architecture ("ISA") and Extended ISA ("EISA") architectures, for example. In addition, the functionality provided for in the components and modules of the computing system may be combined into fewer components and modules or further separated into additional components and modules than described herein.

Additional Considerations

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method of simulating device aging based on a digital waveform representative of a workload of an electronic device, the method comprising:
grouping contiguous sets of cycles into a plurality of segments, each set of cycles corresponding to a segment, wherein each segment has values for a combination of segment parameters that are unique from each of the other segments and a start point that is separated from a start point of an adjacent segment by a pre-defined distance criterion; and
creating scenarios comprising collections of segments based on their distances in an objective space, wherein at least one axis of the objective space represents an amount of degradation due to aging,
wherein grouping the contiguous sets of cycles into the plurality of segments comprises, for each segment:
sampling one or more sequential cycles of the workload,
generating the segment based on the sampled contiguous cycles having a period exceeding a threshold period, and
determining the values for the combination of segment parameters; and
applying an aging model to the segments to simulate the aging for the device based on the workload, wherein the segments are a representation of the digital waveform.

2. The method of claim 1, wherein the pre-defined distance criterion is based on a number of cycles in a segment having a period exceeding the threshold period, and wherein the combination of segment parameters comprises a duty factor (DF), a frequency (f), and a time duration ($\Delta t$) for each segment.

3. The method of claim 1, further comprising clustering contiguous segments into a set of scenarios that correspond to aging models based on start times of the scenarios.

4. The method of claim 3, wherein, when one of the scenarios repeats itself a number of times consecutively, one of the aging models is applied to the repeating scenario to calculate aging for the device based on a pre-defined relationship between degradation of the device and the workload of the device characterized by values for a combination of scenario parameters, wherein the combination of scenario parameters comprises a scenario duty factor (DF), a scenario frequency (f), and a scenario time duration ($\Delta t$) for each scenario and wherein the values for the combination of scenario parameters are determined based on an effective DF for the scenario.

5. The method of claim 4, wherein the pre-defined relationship includes a linear relationship between the degradation of the device and the workload of the device and is characterized by one of the segment DF and the segment f, and each of the segment DF and the segment f is representative of the digital waveform segment.

6. The method of claim 3, wherein a number of different scenarios is repeated at least once over the duration of the digital waveform, and wherein the degradation of each of the different scenarios is stored in a first lookup table relative to an initial condition of the degradation.

7. The method of claim 1, wherein a duty factor (DF), a frequency (f), and a time duration ($\Delta t$) of the combination of segment parameters for the segment are averaged for the sampled cycles of the digital waveform that form the segment.

8. The method of claim 1, wherein applying the aging model comprises accessing look up tables and using the values for the combinations of segment parameter values to simulate short-term and long-term aging for the device.

9. The method of claim 1, wherein grouping the contiguous sets of cycles into the plurality of segments further comprises, for each segment:
   determining that the period of the sampled sequential cycles does not exceed the threshold period;
   aggregating one or more additional sequential cycles with the sampled sequential cycles based on the determination that the period does not exceed the threshold period;
   determining that the period of the aggregated additional sequential cycles with the sampled sequential cycles exceeds the threshold period; and
   generating the segment based on the sampled contiguous cycles and the additional sequential cycles.

10. The method of claim 1, further comprising evaluating the degradation of the device based on a set of aging models for a set of scenarios occurring in an arbitrary sequence over a duration of the digital waveform.

11. The method of claim 1, wherein another one of the at least one axis of the objective space represents energy, maximal power, footprint, or throughput latency.

12. A system for simulating device aging based on a digital waveform representative of a workload of an electronic device, the system comprising:
   one or more processors configured to execute instructions; and
   a non-transitory, computer readable medium configured to store the instructions that, when executed by the processor, cause the one or more processors to:
      group contiguous sets of cycles into a plurality of segments, each set of cycles corresponding to a segment, wherein each segment has values for a combination of segment parameters that are unique from each of the other segments and a start point that is separated from a start point of an adjacent segment by a pre-defined distance criterion; and
      create scenarios comprising collections of segments based on their distances in an objective space, wherein at least one axis of the objective space represents an amount of degradation due to aging,
   wherein the instructions that cause the one or more processors to group the contiguous sets of cycles into the plurality of segments further cause the one or more processors to, for each segment:
      sample one or more sequential cycles of the workload,
      generate the segment based on the sampled contiguous cycles having a period exceeding a threshold period, and
      determine the values for the combination of segment parameters; and
   apply an aging model to the segments to simulate the aging for the device based on the workload, wherein the segments are a representation of the digital waveform.

13. The system of claim 12, wherein another one of the at least one axis of the objective space represents energy, maximal power, footprint, or throughput latency.

* * * * *